United States Patent
Yamamoto et al.

(10) Patent No.: US 12,214,845 B1
(45) Date of Patent: Feb. 4, 2025

(54) ELECTRIC DEVICE AND CONTROL SYSTEM OF HUMAN-POWERED VEHICLE AND NON-TRANSITORY COMPUTER-READABLE STORAGE MEDIUM

(71) Applicant: SHIMANO INC., Sakai (JP)

(72) Inventors: Shunsuke Yamamoto, Sakai (JP); Yu Goto, Sakai (JP); Akihiro Nozaki, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/489,822

(22) Filed: Oct. 18, 2023

(51) Int. Cl.
*B62M 9/122* (2010.01)

(52) U.S. Cl.
CPC .................. *B62M 9/122* (2013.01)

(58) Field of Classification Search
CPC ........ B62M 9/122; B62M 25/08; B62M 6/45; B62M 9/132; F16H 61/702; F16H 2306/40
USPC .............................. 474/70; 701/51
See application file for complete search history.

(56) References Cited

U.S. PATENT DOCUMENTS

| | | | |
|---|---|---|---|
| 9,278,728 B1* | 3/2016 | Sato | B62M 9/122 |
| 9,815,522 B2* | 11/2017 | Tachibana | B62M 25/08 |
| 9,896,156 B2* | 2/2018 | Gao | F16H 61/702 |
| 10,370,062 B2 | 8/2019 | Bortolozzo et al. | |
| 10,780,945 B2* | 9/2020 | Gao | B62M 6/45 |
| 11,066,122 B2* | 7/2021 | Suzuki | B60W 10/18 |
| 11,305,838 B2* | 4/2022 | Liao | H04M 1/72412 |
| 11,685,470 B2 | 6/2023 | Shahana et al. | |
| 2007/0207885 A1* | 9/2007 | Watarai | B62M 25/08 474/70 |
| 2013/0027052 A1 | 1/2013 | Matsumoto et al. | |
| 2015/0210354 A1* | 7/2015 | Kuroda | B62M 25/08 474/70 |
| 2015/0307157 A1* | 10/2015 | Gao | B62M 6/45 701/52 |
| 2016/0288877 A1* | 10/2016 | Goates | B62M 9/122 |
| 2017/0158285 A1* | 6/2017 | Tachibana | B62M 9/122 |
| 2017/0259882 A1* | 9/2017 | Gao | B62M 6/45 |
| 2018/0304966 A1* | 10/2018 | Chien | B62M 9/122 |
| 2019/0351971 A1* | 11/2019 | Dueweling | B62M 9/122 |

(Continued)

FOREIGN PATENT DOCUMENTS

| | | |
|---|---|---|
| DE | 102015016602 | 6/2017 |
| JP | 5303615 B2 | 2/2013 |
| TW | I634043 B | 9/2018 |

*Primary Examiner* — Henry Y Liu
(74) *Attorney, Agent, or Firm* — MORI & WARD, LLP

(57) ABSTRACT

An electric device of a human-powered vehicle comprises electronic controller circuitry. The electronic controller circuitry is configured to obtain at least one of chain guide information and sprocket information. The chain guide information is indicative of at least one chain guide. The sprocket information is indicative of at least one sprocket assembly. The electronic controller circuitry is configured to set one of at least two pieces of gear changing information as setting information based on the at least one of the chain guide information and the sprocket information. The electronic controller circuitry is configured to perform a gear shift control based on the setting information. Each of the at least two pieces of the gear changing information including at least two stop positions of a chain guide respectively corresponding to at least two sprockets of a sprocket assembly.

19 Claims, 19 Drawing Sheets

(56) References Cited

U.S. PATENT DOCUMENTS

2020/0377167 A1\* 12/2020 Suzuki .................... B62J 50/22
2021/0163097 A1\* 6/2021 Liao ....................... B62M 9/122
2022/0234684 A1 7/2022 Hashimoto et al.

\* cited by examiner

ELECTRIC DEVICE AND CONTROL SYSTEM OF HUMAN-POWERED VEHICLE AND NON-TRANSITORY COMPUTER-READABLE STORAGE MEDIUM

BACKGROUND

Technical Field

The present invention relates to an electric device and a control system of a human-powered vehicle and a non-transitory computer-readable storage medium.

Background Information

A human-powered vehicle includes a transmission device configured to change a gear position of the human-powered vehicle. For example, the transmission device uses different groups of stop positions depending on different sprocket assemblies or different chain guides. One of objects of the present disclosure is to smoothen the gear change of the transmission device.

SUMMARY

In accordance with a first aspect of the present invention, an electric device of a human-powered vehicle comprises electronic controller circuitry. The electronic controller circuitry is configured to obtain at least one of chain guide information and sprocket information. The chain guide information is indicative of at least one chain guide. The sprocket information is indicative of at least one sprocket assembly. The electronic controller circuitry is configured to set one of at least two pieces of gear changing information as setting information based on the at least one of the chain guide information and the sprocket information. The electronic controller circuitry is configured to perform a gear shift control based on the setting information. Each of the at least two pieces of the gear changing information including at least two stop positions of a chain guide respectively corresponding to at least two sprockets of a sprocket assembly.

With the electric device according to the first aspect, the setting information enables the transmission device to stop the chain guide in a preferable stop position relative to the sprocket assembly during the gear shift control. This can smoothen the gear change of the transmission device.

In accordance with a second aspect of the present invention, the electric device according to the first aspect is configured so that the sprocket information includes at least one of: sprocket model information of each of at least two different sprocket assemblies; a total number of at least two sprockets included in each of at least two different sprocket assemblies; and a combination of at least two total tooth numbers of at least two sprockets included in each of at least two different sprocket assemblies.

With the electric device according to the second aspect, the sprocket information improves accuracy of the setting information. This can reliably smoothen the gear change of the transmission device.

In accordance with a third aspect of the present invention, the electric device according to the first or second aspect is configured so that the chain guide information includes at least one of: chain-guide model information of each of at least two different chain guides; and a reference distance of each of at least two different chain guides.

With the electric device according to the first aspect, the chain guide improves accuracy of the setting information. This can reliably smoothen the gear change of the transmission device.

In accordance with a fourth aspect of the present invention, the electric device according to the three aspect is configured so that the reference distance includes a distance defined between a pivot axis of one of the at least two different chain guides and a rotational axis of a pulley of the one of the at least two different chain guides.

With the electric device according to the fourth aspect, the reference distance of the chain guide improves accuracy of the setting information. This can more reliably smoothen the gear change of the transmission device.

In accordance with a fifth aspect of the present invention, the electric device according to the third or fourth aspect is configured so that the reference distance includes a distance defined between a first rotational axis of a first pulley of one of the at least two different chain guides and a second rotational axis of a second pulley of the one of the at least two different chain guides.

With the electric device according to the fifth aspect, the reference distance of the chain guide reliably improves accuracy of the setting information. This can more reliably smoothen the gear change of the transmission device.

In accordance with a sixth aspect of the present invention, the electric device according to any one of the first to fifth aspects is configured so that the electronic controller circuitry is configured to store the at least two pieces of the gear changing information.

With the electric device according to the sixth aspect, it is possible to improve processing speed of the electronic controller circuitry.

In accordance with a seventh aspect of the present invention, the electric device according to any one of the first to sixth aspects is configured so that the at least two pieces of the gear changing information includes first gear changing information and second gear changing information. The first gear changing information includes at least two first stop positions of the chain guide. The second gear changing information includes at least two second stop positions of the chain guide. A total number of the at least two first stop positions is different from a total number of the at least two second stop positions.

With the electric device according to the seventh aspect, the gear changing information improves flexibility to control the transmission device.

In accordance with an eighth aspect of the present invention, the electric device according to any one of the first to seventh aspects is configured so that the at least two pieces of the gear changing information respectively correspond to at least two different sprocket assemblies. The electronic controller circuitry is configured to set, as the setting information, one of the at least two pieces of the gear changing information which corresponds to the sprocket assembly.

With the electric device according to the eighth aspect, the gear changing information improves flexibility to control the transmission device.

In accordance with a ninth aspect of the present invention, the electric device according to any one of the first to eighth aspects is configured so that the at least two pieces of the gear changing information respectively correspond to at least two different chain guides. The electronic controller circuitry is configured to set, as the setting information, one of the at least two pieces of the gear changing information which corresponds to the chain guide.

With the electric device according to the ninth aspect, the gear changing information improves flexibility to control the transmission device.

In accordance with a tenth aspect of the present invention, the electric device according to any one of the first to ninth aspects is configured so that the electronic controller circuitry is configured to obtain transmission model information of each of at least two different electric devices. The electronic controller circuitry is configured to set one of the at least two pieces of the gear changing information as the setting information based on the transmission model information.

With the electric device according to the tenth aspect, the transmission device information improves flexibility to control the transmission device.

In accordance with an eleventh aspect of the present invention, the electric device according to any one of the first to tenth aspects further comprises communicator circuitry. The communicator circuitry is configured to receive the at least one of the chain guide information and the sprocket information from a communication device. The communication device is configured to output the at least one of chain guide information and sprocket information.

With the electric device according to the eleventh aspect, it is possible to input the at least one of the chain guide information and the sprocket information using the communication device.

In accordance with a twelfth aspect of the present invention, the electric device according to the eleventh aspect is configured so that the communicator circuitry is configured to wirelessly receive the at least one of the chain guide information and the sprocket information from the communication device.

With the electric device according to the twelfth aspect, it is possible to omit an electric cable configured to connect the transmission device and the communication device.

In accordance with a thirteenth aspect of the present invention, the electric device according to the eleventh or twelfth aspect is configured so that the electronic controller circuitry is configured to obtain, via the communicator circuitry, a user input received by the communication device.

With the electric device according to the thirteenth aspect, it is possible to input the at least one of the chain guide information and the sprocket information using the communication device.

In accordance with a fourteenth aspect of the present invention, the electric device according to any one of the eleventh to thirteenth aspects is configured so that the communication device is configured to obtain the at least two pieces of the gear changing information through an internet network.

With the electric device according to the fourteenth aspect, it is possible to obtain the gear information via the internet network.

In accordance with a fifteenth aspect of the present invention, the electric device according to any one of the eleventh to fourteenth aspects is configured so that the electronic controller circuitry is configured to execute a software update using the communicator circuitry. The electronic controller circuitry is configured to update the at least two pieces of the gear changing information through the software update.

With the electric device according to the fifteenth aspect, the software updates improves accuracy of the setting information.

In accordance with a sixteenth aspect of the present invention, a control system of a human-powered vehicle comprises the electric device according to any one of the first to fifteenth aspects and a communication device configured to output the at least one of chain guide information and sprocket information.

With the control system according to the sixteenth aspect, it is possible to make it easier to obtain the at least one of chain guide information and sprocket information using the communication device.

In accordance with a seventeenth aspect of the present invention, a non-transitory computer-readable storage medium storing at least one program for causing at least one computer to execute at least one process comprises: obtaining at least one of chain guide information and sprocket information via a user interface, the chain guide information being indicative of at least one chain guide, the sprocket information being indicative of at least one sprocket assembly; obtaining transmission model information of each of at least two different electric devices via the user interface; and transmitting via communicator circuitry to an electric device, based on the transmission model information and the at least one of the chain guide information and the sprocket information, information necessary to set one of at least two pieces of gear changing information as setting information.

With the non-transitory computer-readable storage medium according to the seventeenth aspect, it is possible to make it easier to obtain the information necessary to set the one of at least two pieces of gear changing information as setting information using the user interface and the communication circuitry.

In accordance with an eighteenth aspect of the present invention, the non-transitory computer-readable storage medium according to the seventeenth aspect is configured so that the sprocket information includes at least one of: sprocket model information of each of at least two different sprocket assemblies; a total number of at least two sprockets included in each of at least two different sprocket assemblies; and a combination of at least two total tooth numbers of at least two sprockets included in each of at least two different sprocket assemblies.

With the electric device according to the eighteenth aspect, the sprocket information improves accuracy of the setting information.

In accordance with a nineteenth aspect of the present invention, the non-transitory computer-readable storage medium according to the seventeenth or eighteenth aspect is configured so that the chain guide information includes at least one of: chain-guide model information of each of at least two different chain guides; and a reference distance of each of at least two different chain guides.

With the electric device according to the nineteenth aspect, the chain guide improves accuracy of the setting information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
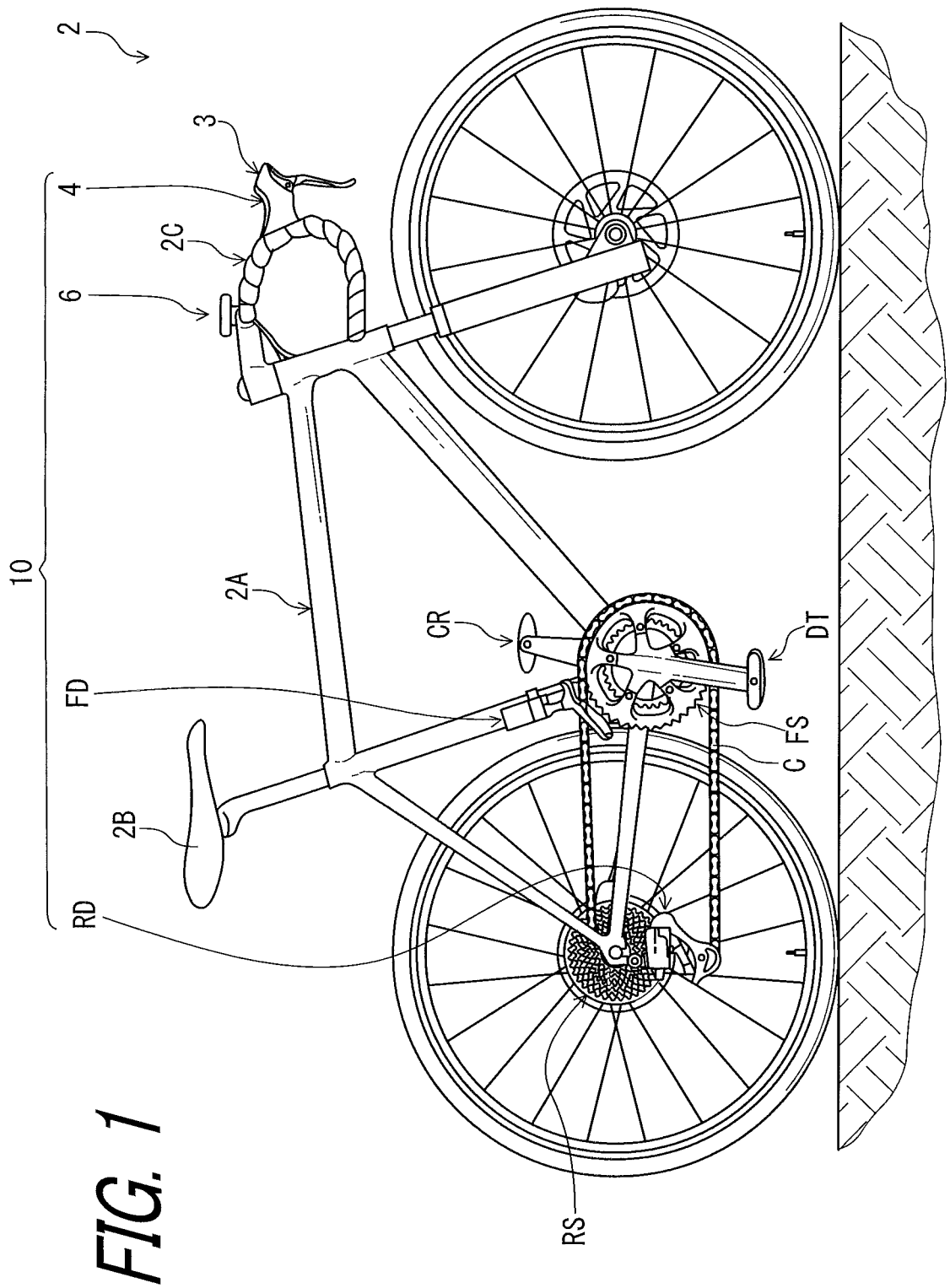
FIG. 1 is a side elevational view of a human-powered vehicle including an electric device in accordance with one of embodiments.

The embodiments will now be described with reference to the accompanying drawings, wherein like reference numerals designate corresponding or identical elements throughout the various drawings.

As seen in FIG. 1, a human-powered vehicle 2 includes a control system 10 in accordance with one of embodiments. The control system 10 of the human-powered vehicle 2 comprises an electric device RD. The control system 10 of the human-powered vehicle 2 comprises an electric device FD. The control system 10 of the human-powered vehicle 2 comprises an operating device 4. The control system 10 of the human-powered vehicle 2 comprises a communication device 6. Namely, the human-powered vehicle 2 includes the operating device 4, the communication device 6, the electric device RD, and the electric device FD.

The human-powered vehicle 2 includes a vehicle body 2A, a saddle 2B, a handlebar 2C, and a drive train DT. The drive train DT includes a crank CR, a sprocket assembly FS, a sprocket assembly RS, and a chain C. The sprocket assembly FS is secured to the crank CR. The sprocket assembly RS is rotatably mounted to the vehicle body 2A. The chain C is engaged with the sprocket assembly FS and the sprocket assembly RS.

The operating device 4 is configured to be mounted to the handlebar 2C. The electric device RD is mounted to the vehicle body 2A. The electric device RD is configured to shift the chain C relative to at least two sprockets of the sprocket assembly RS to change a gear position. The electric device FD is configured to shift the chain C relative to at least two sprockets of the sprocket assembly FS to change a gear position. The electric device RD can also be referred to as a transmission device RD. The electric device FD can also be referred to as a transmission device FD. The electric device RD can include another device other than a transmission device if needed or desired. The electric device FD can include another device other than a transmission device if needed or desired.

In the present application, the term "human-powered vehicle" includes a vehicle to travel with a motive power including at least a human power of a user (i.e., rider) who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source (e.g., an internal-combustion engine, an electric motor) as motive power. Generally, a light road vehicle, which includes a vehicle that does not require a driver's license for a public road, is assumed as the human-powered vehicle.

In the present embodiment, the electric device RD or FD is applied to a road bike. However, the electric device RD or FD can be applied to an any kind of human-powered vehicles such as a mountain bike, a road bike, a city bike, a cargo bike, a hand bike, and a recumbent bike if needed or desired. Furthermore, the electric device RD or FD or modifications thereof can be applied to an electric bike (E-bike). The electric bike includes an electrically assisted bicycle configured to assist propulsion of a vehicle with an electric motor.

In the present embodiment, the electric device RD includes a rear derailleur, and the electric device FD includes a front derailleur. Namely, the electric device RD can also be referred to as a rear transmission device RD. The electric device FD can also be referred to as a front transmission device FD. However, the electric device RD can include another device other than a rear derailleur if needed or desired. The electric device RD can include another device other than a rear transmission device if needed or desired. The electric device FD can include another device other than a front derailleur if needed or desired. The electric device FD can include another device other than a front transmission device if needed or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C. Accordingly, these terms, as utilized to describe the electric device RD, the electric device FD, or other components, should be interpreted relative to the human-powered vehicle 2 equipped with the electric device RD and the electric device FD as used in an upright riding position on a horizontal surface.

Figure 2:
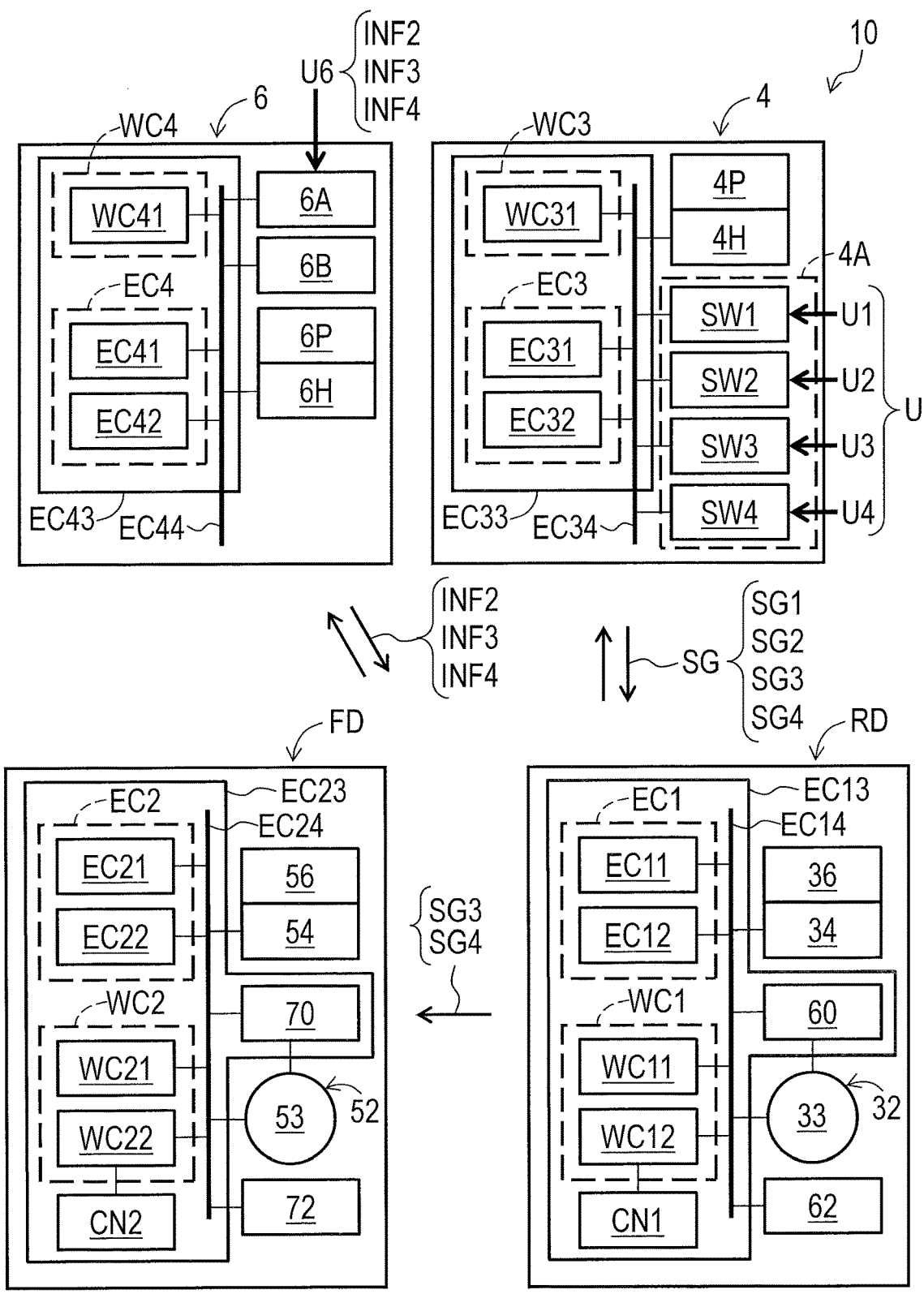
FIG. 2 is a schematic block diagram of the electric device of the human-powered vehicle illustrated in FIG. 1.

As seen in FIG. 2, the operating device 4 is configured to receive a user gear-change input U. The operating device 4 includes a user operating interface 4A. The user operating interface 4A is configured to receive the user gear-change input U. The operating device 4 is configured to generate a control signal SG in response to the user gear-change input U.

The user gear-change input U includes a first user gear-change input U1, a second user gear-change input U2, a third user gear-change input U3, and a fourth user gear-change input U4. The control signal SG includes a first control signal SG1, a second control signal SG2, a third control signal SG3, and a fourth control signal SG4.

The operating device 4 is configured to receive the first user gear-change input U1. The operating device 4 is configured to generate the first control signal SG1 in response to the first user gear-change input U1. The operating device 4 is configured to transmit the first control signal SG1. The electric device RD is configured to change a gear position based on the first control signal SG1 transmitted from the operating device 4. For example, each of the first user gear-change input U1 and the first control signal SG1 is indicative of upshifting of the electric device RD. The electric device RD is configured to perform upshifting based on the first control signal SG1 transmitted from the operating device 4.

The operating device 4 is configured to receive the second user gear-change input U2. The operating device 4 is configured to generate the second control signal SG2 in response to the second user gear-change input U2. The operating device 4 is configured to transmit the second control signal SG2. The electric device RD is configured to change a gear position based on the second control signal SG2 transmitted from the operating device 4. Each of the second user gear-change input U2 and the second control signal SG2 is indicative of downshifting of the electric device RD. The electric device RD is configured to perform downshifting based on the second control signal SG2 transmitted from the operating device 4.

The operating device 4 is configured to receive the third user gear-change input U3. The operating device 4 is configured to generate the third control signal SG3 in response to the third user gear-change input U3. The operating device 4 is configured to transmit the third control signal SG3. The electric device FD is configured to change a gear position based on the third control signal SG3 transmitted from the operating device 4. Each of the third user gear-change input U3 and the third control signal SG3 is indicative of upshifting of the electric device FD. The electric device FD is configured to perform upshifting based on the third control signal SG3 transmitted from the operating device 4.

The operating device 4 is configured to receive the fourth user gear-change input U4. The operating device 4 is configured to generate the fourth control signal SG4 in response to the fourth user gear-change input U4. The operating device 4 is configured to transmit the fourth control signal SG4. The electric device FD is configured to change a gear position based on the fourth control signal SG4 transmitted from the operating device 4. Each of the fourth user gear-change input U4 and the fourth control signal SG4 is indicative of downshifting of the electric device FD. The electric device FD is configured to perform downshifting based on the fourth control signal SG4 transmitted from the operating device 4.

The user operating interface 4A includes an electric switch SW1. The electric switch SW1 is configured to receive the first user gear-change input U1. The electric switch SW1 is configured to generate the first control signal SG1 based on the first user gear-change input U1.

The user operating interface 4A includes an electric switch SW2. The electric switch SW2 is configured to receive the second user gear-change input U2. The electric switch SW2 is configured to generate the second control signal SG2 based on the second user gear-change input U2.

The user operating interface 4A includes an electric switch SW3. The electric switch SW3 is configured to receive the third user gear-change input U3. The electric switch SW3 is configured to generate the third control signal SG3 based on the third user gear-change input U3.

The user operating interface 4A includes an electric switch SW4. The electric switch SW4 is configured to receive the fourth user gear-change input U4. The electric switch SW4 is configured to generate the fourth control signal SG4 based on the fourth user gear-change input U4.

In the present embodiment, the user operating interface 4A is configured to receive each of the first, second, third, and fourth user gear-change inputs U1, U2, U3, and U4. The user operating interface 4A includes the electric switches SW1, SW2, SW3, and SW4. However, at least one of the first, second, third, and fourth user gear-change inputs U1, U2, U3, and U4 can be omitted from the operating device 4 if needed or desired. At least one of the electric switches SW1, SW2, SW3, and SW4 can be omitted from the operating device 4 if needed or desired.

For example, in a case where the electric switches SW3 and SW4 are omitted from the operating device 4, the operating device 4 is configured to generate the third control signal SG3 in response to concurrent presses of the electric switches SW1 and SW2. The electric device FD is configured to perform upshifting in response to the third control signal SG3 in a case where the electric device FD is in a low gear position of two gear positions. The electric device FD is configured to perform downshifting in response to the third control signal SG3 in a case where the electric device FD is in a top gear position of two gear positions.

In FIG. 2, the operating device 4 is depicted as a single unit. However, the operating device 4 can include separate devices if needed or desired. In such modifications, each of electric parts of the operating device 4 can be included in one of the separate device. For example, the operating device 4 can include a first operating device and a second operating device. The first operating device can include the electric switches SW1 and SW2 while the second operating device can include the electric switches SW3 and SW4. In the case where the electric switches SW3 and SW4 are omitted from the operating device 4, the first operating device can include one of the electric switches SW1 and SW2 while the second operating device can include the other of the electric switches SW1 and SW2.

As seen in FIG. 2, the electric device RD is configured to be electrically connected to the operating device 4. The electric device FD is configured to be electrically connected to the operating device 4. In the present embodiment, the electric device RD is configured to be wirelessly connected to the operating device 4. The electric device RD is configured to be wirelessly connected to the electric device FD. However, the electric device FD can be configured to be electrically connected directly to the operating device 4 without the electric device RD if needed or desired.

For example, the electric device RD is configured to wirelessly receive each of the first, second, third, and fourth control signals SG1, SG2, SG3, and SG4 from the operating device 4. The electric device RD is configured to wirelessly transmit the third control signal SG3 to the electric device FD in a case where the electric device RD wirelessly receives the third control signal SG3 from the operating device 4. The electric device RD is configured to wirelessly transmit the fourth control signal SG4 to the electric device FD in a case where the electric device RD wirelessly receives the fourth control signal SG4 from the operating device 4. The operating device 4 can be configured to communicate with each of the electric devices RD and FD if needed or desired. For example, the operating device 4 can be configured to wirelessly transmit at least one of the third control signal SG3 and the fourth control signal SG4 directly to the electric device FD without the electric device RD.

The electric device RD can be configured to communicate with the operating device 4 via an electric cable if needed or desired. The electric device RD can be configured to communicate with the electric device FD via an electric cable if needed or desired. The electric device FD can be configured to communicate with the operating device 4 via an electric cable without the electric device RD if needed or desired.

As seen in FIG. 2, the communication device 6 is configured to receive a user input U6. The user input U6 is indicative of information relating to the human-powered vehicle 2. For example, the user input U6 is indicative of at least one of chain guide information INF2 and sprocket information INF3. The chain guide information INF2 is indicative of at least one chain guide. The sprocket information INF3 is indicative of at least one sprocket assembly. The user input U6 is indicative of transmission model information INF4. The transmission model information INF4 is indicative of a model number of at least one transmission device.

The communication device 6 can include at least one of a smartphone, a tablet computer, a cycle computer, and a personal computer. The communication device 6 includes a user interface 6A and a display 6B. The user interface 6A is configured to receive the user input U6. The display 6B is configured to display information relating to the human-powered vehicle 2. The user interface 6A can include at least one of a touch panel and a keyboard. The communication device 6 enables the user to input the user input U6 to the communication device 6 via the user interface 6A while seeing the information displayed in the display 6B.

The electric device RD is configured to be electrically connected to the communication device 6. The communication device 6 is configured to transmit information indicative of the user input U6 to the electric device RD. The communication device 6 is configured to transmit the at least one of the chain guide information INF2 and the sprocket information INF3 to the electric device RD. The communication device 6 is configured to transmit the transmission model information INF4 to the electric device RD. The electric device RD is configured to receive the at least one of the chain guide information INF2 and the sprocket information INF3 from the communication device 6. The electric device RD is configured to receive the transmission model information INF4 from the communication device 6.

In the present embodiment, the electric device RD is configured to be wirelessly connected to the communication device 6. The electric device RD is configured to be wirelessly connected to the electric device FD. The electric device FD is configured to be wirelessly connected to the communication device 6 via the electric device RD. However, the electric device FD can be configured to be electrically connected to the communication device 6 if needed or desired.

The communication device 6 is configured to wirelessly transmit information indicative of the user input U6 to the electric device RD. The communication device 6 is configured to wirelessly transmit the at least one of the chain guide information INF2 and the sprocket information INF3 to the electric device RD. The communication device 6 is configured to wirelessly transmit the transmission model information INF4 to the electric device RD. The electric device RD is configured to wirelessly receive the at least one of the chain guide information INF2 and the sprocket information INF3 from the communication device 6. The electric device RD is configured to wirelessly receive the transmission model information INF4 from the communication device 6.

However, the electric device RD can be configured to be electrically connected to at least one of the communication device 6 and the electric device FD via an electric cable if needed or desired. The electric device FD can be configured to be electrically connected to the communication device 6 via the electric device RD via an electric cable if needed or desired.

The communication device 6 can be configured to transmit information indicative of the user input U6 to the electric device RD via an electric cable if needed or desired. The communication device 6 can be configured to transmit the at least one of the chain guide information INF2 and the sprocket information INF3 to the electric device RD via an electric cable if needed or desired. The communication device 6 can be configured to transmit the transmission model information INF4 to the electric device RD via an electric cable if needed or desired. The electric device RD can be configured to wirelessly receive the at least one of the chain guide information INF2 and the sprocket information INF3 from the communication device 6 via an electric cable if needed or desired. The electric device RD can be configured to wirelessly receive the transmission model information INF4 from the communication device 6 via an electric cable if needed or desired.

Figure 3:
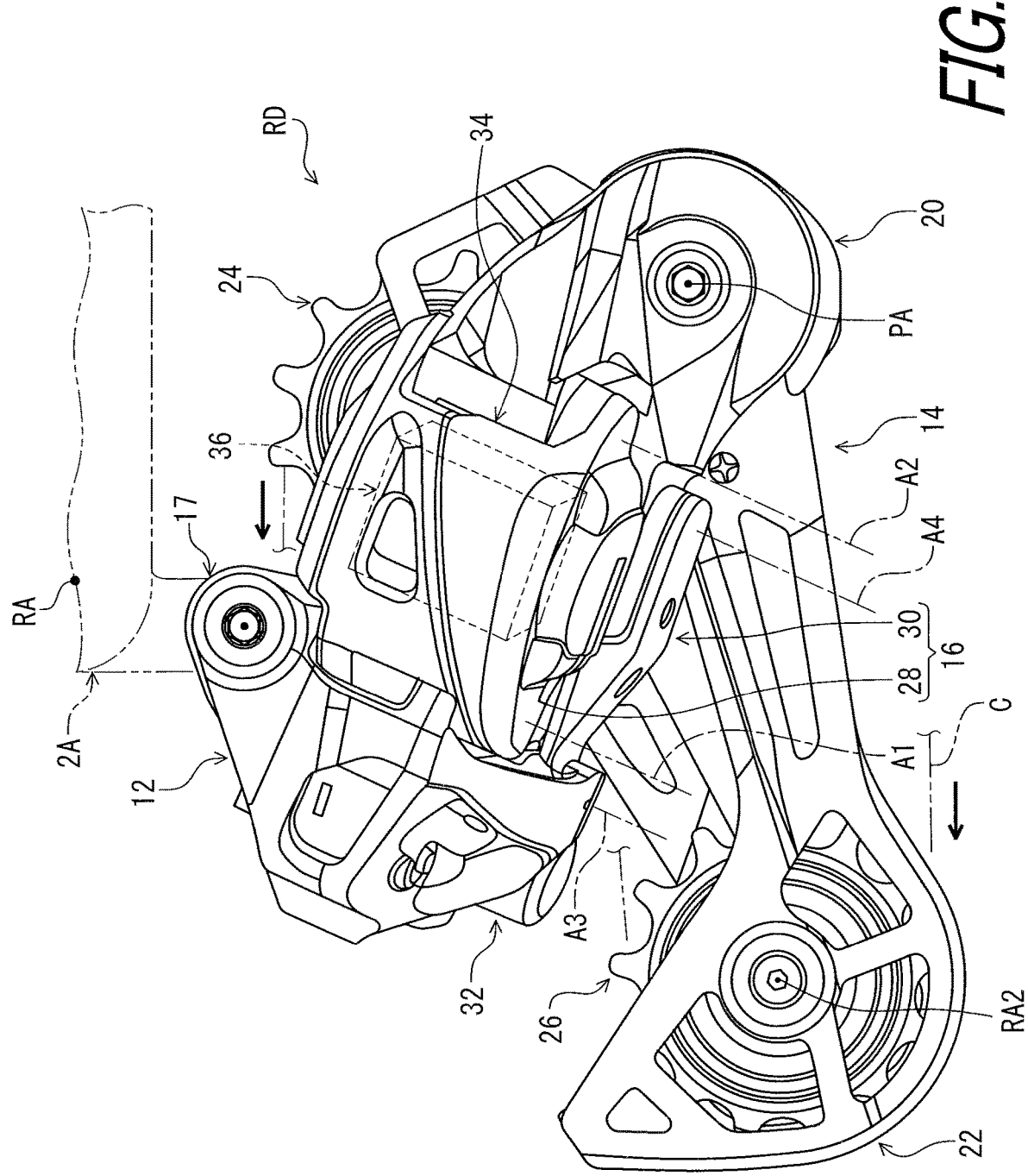
FIG. 3 is a side elevational view of a transmission device of the human-powered vehicle illustrated in FIG. 1.

As seen in FIG. 3, the electric device RD comprises a base member 12, a chain guide 14, and a linkage structure 16. The base member 12 is configured to be coupled to the vehicle body 2A. The chain guide 14 is movable relative to the base member 12. The linkage structure 16 movably couples the base member 12 and the chain guide 14. The base member 12 includes a mounting portion 17. The mounting portion 17 is configured to be fastened to the vehicle body 2A.

The chain guide 14 is contactable with the chain C. The chain guide 14 is configured to shift the chain C relative to at least two sprockets of the sprocket assembly RS (see e.g., FIG. 1) to change a gear position.

Figure 4:
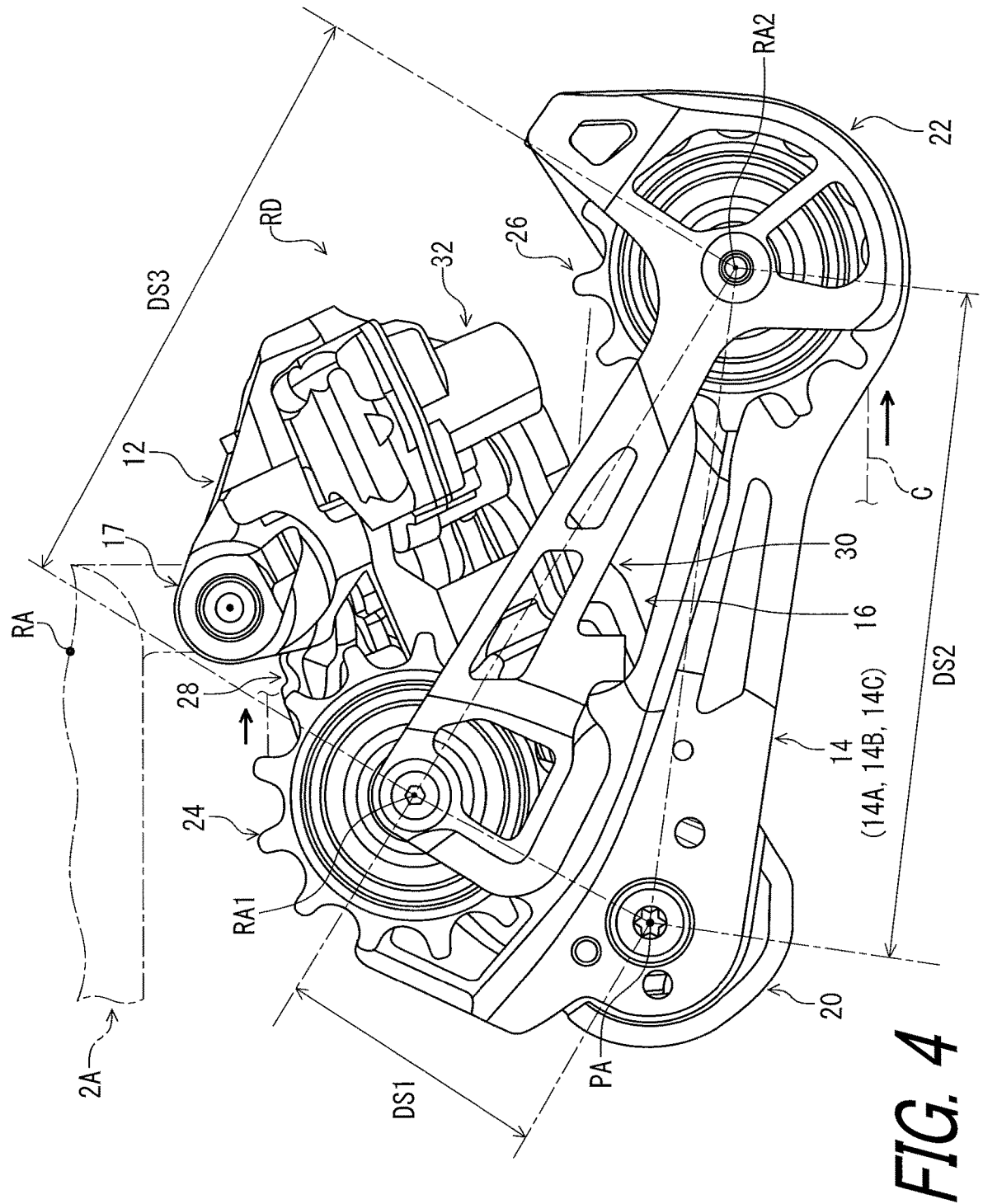
FIG. 4 is another side elevational view of the transmission device of the human-powered vehicle illustrated in FIG. 1.

As seen in FIG. 4, the chain guide 14 includes a movable member 20, a guide plate 22, a first pulley 24, and a second pulley 26. The guide plate 22 is pivotally coupled to the movable member 20 about the pivot axis PA. The first pulley 24 is rotatably coupled to the guide plate 22 about a first rotational axis RA1. The second pulley 26 is rotatably coupled to the guide plate 22 about a second rotational axis RA2. The first pulley 24 is configured to be engaged with the chain C. The second pulley 26 is configured to be engaged with the chain C. The structure of the chain guide 14 is not limited to the above structure. For example, the movable member 20 can be omitted from the chain guide 14 if needed or desired. The first pulley 24 can also be referred to as a pulley 24. The second pulley 26 can also be referred to as a pulley 26. The first rotational axis RA1 can also be referred to as a rotational axis RA1. The second rotational axis RA2 can also be referred to as a rotational axis RA2.

The linkage structure 16 movably couples the base member 12 and the chain guide 14. The linkage structure 16 movably couples the base member 12 and the movable member 20. In the present embodiment, the linkage structure 16 includes a first link 28 and a second link 30. The first link 28 is pivotally coupled to the base member 12 about a first pivot axis A1. The first link 28 is pivotally coupled to the chain guide 14 (e.g., the movable member 20) about a second pivot axis A2. The second link 30 is pivotally coupled to the base member 12 about a third pivot axis A3. The second link 30 is pivotally coupled to the chain guide 14 (e.g., the movable member 20) about a fourth pivot axis A4. The first to fourth pivot axes A1 to A4 are parallel to each other. However, one of the first link 28 and the second link 30 can be omitted from the linkage structure 16 if needed or desired. The structure of the linkage structure 16 is not limited to the above structure. At least one of the first to fourth pivot axes A1 to A4 can be non-parallel to another of the first to fourth pivot axes A1 to A4.

As seen in FIG. 4, the electric device RD comprises a motor unit 32. The motor unit 32 comprises an electrical actuator 33. Examples of the electrical actuator 33 include an electric motor. The electrical actuator 33 is configured to generate a driving force. The driving force includes a driving rotational force. In the present application, the term "rotational force" can also be referred to as "torque" or "moment." The electrical actuator 33 is configured to generate the driving rotational force. The electrical actuator 33 is configured to generate the driving rotational force to actuate an actuated device of the human-powered vehicle 2. The electrical actuator 33 is configured to generate the driving rotational force to move the chain guide 14 relative to the base member 12.

The motor unit 32 is provided to one of the base member 12, the chain guide 14, and the linkage structure 16. The electrical actuator 33 is provided to one of the base member 12, the chain guide 14, and the linkage structure 16. In the present embodiment, the motor unit 32 is provided to the base member 12. The electrical actuator 33 is provided to the base member 12. However, the motor unit 32 can be provided to one of the chain guide 14 and the linkage structure 16 if needed or desired. The electrical actuator 33 can be provided to one of the chain guide 14 and the linkage structure 16 if needed or desired.

The motor unit 32 is provided to the base member 12 to apply the driving force (e.g., the driving rotational force) to the chain guide 14. The motor unit 32 is configured to move at least one of the chain guide 14 and the linkage structure 16 relative to the base member 12. In the present embodiment, the motor unit 32 is coupled to the linkage structure 16 to move the chain guide 14 via the linkage structure 16. However, the motor unit 32 can be directly coupled to the chain guide 14 to move the chain guide 14 relative to the base member 12 if needed or desired.

The motor unit 32 includes at least one gear. The at least one gear is configured to transmit the driving rotational force to the linkage structure 16. For example, the at least one gear is configured to transmit the driving rotational force to the second link 30. However, the at least one gear is configured to transmit the driving rotational force to the first link 28 or the chain guide 14 if needed or desired. The motor unit 32 can include other structures such as a protection structure (e.g., a torque limiter) if needed or desired.

As seen in FIG. 3, the electric device RD comprises a power source holder 34. The power source holder 34 is configured to detachably and reattachably hold an electric power source 36. The power source holder 34 is electrically connected to the motor unit 32 to supply electricity from the electric power source 36 to the motor unit 32. Examples of the electric power source 36 include a primary battery and a secondary battery. However, the power source holder 34 can be omitted from the electric device RD if needed or desired. In such embodiments, the electric device RD can be configured to be electrically connected to another electric power source via an electric cable if needed or desired.

The power source holder 34 is provided to one of the base member 12, the chain guide 14, and the linkage structure 16. The motor unit 32 is provided to one of the base member 12, the chain guide 14, and the linkage structure 16. The power source holder 34 is provided to another of the base member 12, the chain guide 14, and the linkage structure 16. The motor unit 32 is provided to one of the base member 12 and the linkage structure 16. The power source holder 34 is provided to the other of the base member 12 and the linkage structure 16.

In the present embodiment, the power source holder 34 is provided to the linkage structure 16. The power source holder 34 is provided to the first link 28. However, the motor unit 32 can be provided to one of the chain guide 14 and the linkage structure 16 if needed or desired. The motor unit 32 can be provided to one of the first link 28 and the second link 30 if needed or desired. The power source holder 34 can be provided to one of the base member 12 and the chain guide 14 if needed or desired. The power source holder 34 can be provided to the second link 30 if needed or desired. The power source holder 34 can be omitted from the electric device RD if needed or desired.

Figure 5:
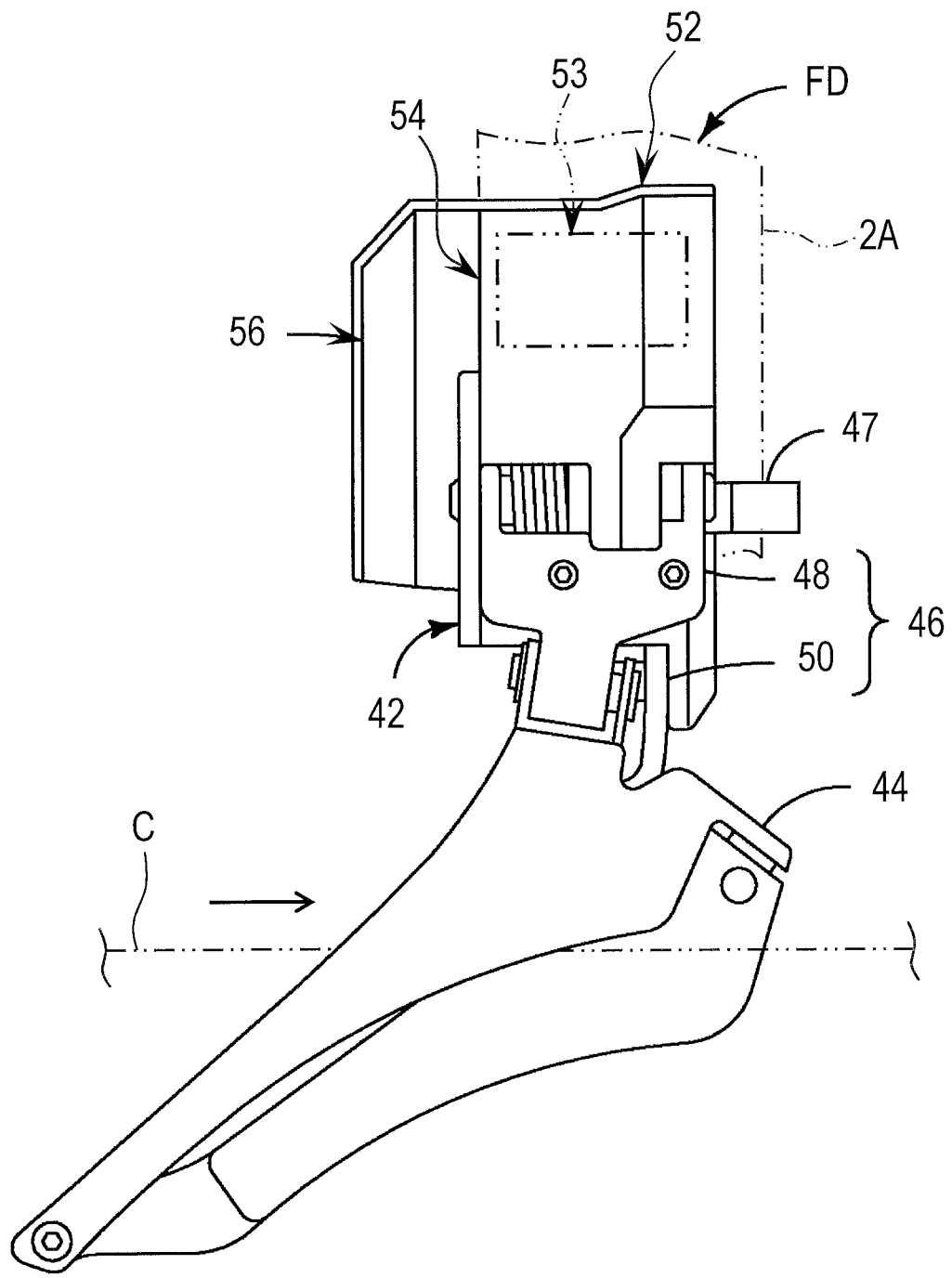
FIG. 5 is a side elevational view of a transmission device of the human-powered vehicle illustrated in FIG. 1.

As seen in FIG. 5, the electric device FD comprises a base member 42, a chain guide 44, and a linkage structure 46. The base member 42 is configured to be coupled to the vehicle body 2A. The chain guide 44 is movable relative to the base member 42. The linkage structure 46 movably couples the base member 42 and the chain guide 44. The base member 42 includes a mounting portion 47. The mounting portion 47 is configured to be fastened to the vehicle body 2A.

The chain guide 44 is contactable with the chain C. The chain guide 44 is configured to shift the chain C relative to at least two sprockets of the sprocket assembly FS (see e.g., FIG. 1) to change a gear position.

The linkage structure 46 movably couples the base member 42 and the chain guide 44. In the present embodiment, the linkage structure 46 includes a first link 48 and a second link 50. The first link 48 is pivotally coupled to the base member 42. The first link 48 is pivotally coupled to the chain guide 44. The second link 50 is pivotally coupled to the base member 42. The second link 50 is pivotally coupled to the chain guide 44. The structure of the linkage structure 46 is not limited to the above structure. One of the first link 48 and the second link 50 can be omitted from the linkage structure 46 if needed or desired.

The electric device FD comprises a motor unit 52. The motor unit 52 comprises an electrical actuator 53. Examples of the electrical actuator 53 include an electric motor. The electrical actuator 53 is configured to generate a driving force. The driving force includes a driving rotational force. The electrical actuator 53 is configured to generate the driving rotational force. The electrical actuator 53 is configured to generate the driving rotational force to actuate an actuated device of the human-powered vehicle 2. The electrical actuator 53 is configured to generate the driving rotational force to move the chain guide 44 relative to the base member 42.

The motor unit 52 is provided to one of the base member 42, the chain guide 44, and the linkage structure 46. The electrical actuator 53 is provided to one of the base member 42, the chain guide 44, and the linkage structure 46. In the present embodiment, the motor unit 52 is provided to the base member 42. The electrical actuator 53 is provided to the base member 42. However, the motor unit 52 can be provided to one of the chain guide 44 and the linkage structure 46 if needed or desired. The electrical actuator 53 can be provided to one of the chain guide 44 and the linkage structure 46 if needed or desired.

The motor unit 52 is provided to the base member 42 to apply the driving force (e.g., the driving rotational force) to the chain guide 44. The motor unit 52 is configured to move at least one of the chain guide 44 and the linkage structure 46 relative to the base member 42. In the present embodiment, the motor unit 52 is coupled to the linkage structure 46 to move the chain guide 44 via the linkage structure 46. However, the motor unit 52 can be directly coupled to the chain guide 44 to move the chain guide 44 relative to the base member 42 if needed or desired.

The motor unit 52 includes at least one gear. The at least one gear is configured to transmit the driving rotational force to the linkage structure 46. For example, the at least one gear is configured to transmit the driving rotational force to the second link 30. However, the at least one gear is configured to transmit the driving rotational force to the first link 28 or the chain guide 44 if needed or desired. The motor unit 52 can include other structures such as a protection structure (e.g., a torque limiter) if needed or desired.

As seen in FIG. 5, the electric device FD comprises a power source holder 54. The power source holder 54 is configured to detachably and reattachably hold an electric power source 56. The power source holder 54 is electrically connected to the motor unit 52 to supply electricity from the electric power source 56 to the motor unit 52. Examples of the electric power source 56 include a primary battery and a secondary battery. However, the power source holder 54 can be omitted from the electric device FD if needed or desired. In such embodiments, the electric device FD can be configured to be electrically connected to another electric power source via an electric cable if needed or desired.

The power source holder 54 is provided to one of the base member 42, the chain guide 44, and the linkage structure 46. The motor unit 52 is provided to one of the base member 42, the chain guide 44, and the linkage structure 46. In the present embodiment, the motor unit 52 is provided to the base member 42. The power source holder 54 is provided to the base member 42. However, the motor unit 52 can be provided to one of the chain guide 44 and the linkage structure 46 if needed or desired. The power source holder 54 can be provided to one of the chain guide 44 and the linkage structure 46 if needed or desired. The power source holder 54 can be omitted from the electric device FD if needed or desired.

As seen in FIG. 2, the operating device 4 comprises a power source holder 4H. The power source holder 4H is configured to detachably and reattachably hold an electric power source 4P. The power source holder 4H is electrically connected to the motor unit 32 to supply electricity from the electric power source 4P to the user operating interface 4A. Examples of the electric power source 4P include a primary battery and a secondary battery. However, the power source holder 4H can be omitted from the operating device 4 if needed or desired. In such embodiments, the operating device 4 can be configured to be electrically connected to another electric power source via an electric cable if needed or desired.

As seen in FIG. 2, the communication device 6 comprises a power source holder 6H. The power source holder 6H is configured to detachably and reattachably hold an electric power source 6P. The power source holder 6H is electrically connected to the motor unit 32 to supply electricity from the electric power source 6P to the user interface 6A and the display 6B. Examples of the electric power source 6P include a primary battery and a secondary battery. However, the power source holder 6H can be omitted from the communication device 6 if needed or desired. In such embodiments, the communication device 6 can be configured to be electrically connected to another electric power source via an electric cable if needed or desired.

As seen in FIG. 2, the electric device RD of the human-powered vehicle 2 comprises electronic controller circuitry EC1. The electronic controller circuitry EC1 is electrically connected to the motor unit 32. The electronic controller circuitry EC1 is configured to control the motor unit 32 to move the chain guide 14 relative to the base member 12 based on the control signal SG. The electronic controller circuitry EC1 is electrically connected to the power source holder 34 to receive electricity from the electric power source 36 via the power source holder 34.

In the present embodiment, the electronic controller circuitry EC1 is configured to obtain the control signal SG from the operating device 4. However, the electronic controller circuitry EC1 can be configured to obtain the control signal SG from another device other than the operating device 4 if needed or desired. The control signal SG can be automatically generated by the electronic controller circuitry EC1 or by another device other than the electronic controller circuitry EC1 based on information relating to the human-powered vehicle 2 if needed or desired.

As seen in FIG. 2, the electronic controller circuitry EC1 includes a processor EC11 and a memory EC12. The electric device RD includes a circuit board EC13 and a system bus EC14. The processor EC11 is coupled to the memory EC12. The memory EC12 is coupled to the processor EC11. The processor EC11 and the memory EC12 are electrically mounted on the circuit board EC13. The processor EC11 is electrically connected to the memory EC12 via the circuit board EC13 and the system bus EC14. The memory EC12 is electrically connected to the processor EC11 via the circuit board EC13 and the system bus EC14. For example, the electronic controller circuitry EC1 includes a semiconductor. The processor EC11 includes a semiconductor. The memory EC12 includes a semiconductor. However, the electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a non-transitory computer-readable storage medium EC12. Namely, the electronic controller circuitry EC1 includes the non-transitory computer-readable storage medium EC12.

The electronic controller circuitry EC1 is configured to execute at least one control algorithm of the electric device RD. For example, the electronic controller circuitry EC1 is programed to execute at least one control algorithm of the electric device RD. The memory EC12 stores at least one program including at least one program instruction. The at least one program is read into the processor EC11, and thereby the at least one control algorithm of the electric device RD is executed based on the at least one program. The electric device RD can also be referred to as at least one computer RD.

The structure of the electronic controller circuitry EC1 is not limited to the above structure. The structure of the electronic controller circuitry EC1 is not limited to the processor EC11 and the memory EC12. The electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired. The electronic controller circuitry EC1 can include the processor EC11, the memory EC12, the circuit board EC13, and the system bus EC14 if needed or desired. The electronic controller circuitry EC1 can be at least two electronic controllers which are separately provided.

The electronic controller circuitry EC1 can include at least two electronic controllers which are separately provided. The at least one control algorithm of the electric device RD can be executed by the at least two electronic controllers if needed or desired. The electronic controller circuitry EC1 can include at least two hardware processors which are separately provided. The electronic controller circuitry EC1 can include at least two hardware memories which are separately provided. The at least one control algorithm of the electric device RD can be executed by the at least two hardware processors if needed or desired. The at least one control algorithm of the electric device RD can be stored in the at least two hardware memories if needed or desired. The electronic controller circuitry EC1 can include at least two circuit boards which are separately provided if needed or desired. The electronic controller circuitry EC1 can include at least two system buses which are separately provided if needed or desired.

As seen in FIG. 2, the electric device FD of the human-powered vehicle 2 comprises electronic controller circuitry EC2. The electronic controller circuitry EC2 is electrically connected to the motor unit 52. The electronic controller circuitry EC2 is configured to control the motor unit 52 to move the chain guide 14 relative to the base member 12 based on the control signal SG. The electronic controller circuitry EC2 is electrically connected to the power source holder 54 to receive electricity from the electric power source 36 via the power source holder 54.

In the present embodiment, the electronic controller circuitry EC2 is configured to obtain the control signal SG from the operating device 4. However, the electronic controller circuitry EC2 can be configured to obtain the control signal SG from another device other than the operating device 4 if needed or desired. The control signal SG can be automatically generated by the electronic controller circuitry EC2 or by another device other than the electronic controller circuitry EC2 based on information relating to the human-powered vehicle 2 if needed or desired.

As seen in FIG. 2, the electronic controller circuitry EC2 includes a processor EC21 and a memory EC22. The electric device FD includes a circuit board EC23 and a system bus EC24. The processor EC21 is coupled to the memory EC22. The memory EC22 is coupled to the processor EC21. The processor EC21 and the memory EC22 are electrically mounted on the circuit board EC23. The processor EC21 is electrically connected to the memory EC22 via the circuit board EC23 and the system bus EC24. The memory EC22 is electrically connected to the processor EC21 via the circuit board EC23 and the system bus EC24. For example, the electronic controller circuitry EC2 includes a semiconductor. The processor EC21 includes a semiconductor. The memory EC22 includes a semiconductor. However, the electronic controller circuitry EC2 can be free of a semiconductor if needed or desired. The processor EC21 can be free of a semiconductor if needed or desired. The memory EC22 can be free of a semiconductor if needed or desired.

For example, the processor EC21 includes at least one of a central processing unit (CPU), a micro processing unit (MPU), and a memory controller. The memory EC22 is electrically connected to the processor EC21. For example, the memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC22 includes storage areas each having an address. The processor EC21 is configured to control the memory EC22 to store data in the storage areas of the memory EC22 and reads data from the storage areas of the memory EC22. The processor EC21 can also be referred to as a hardware processor EC21 or a processor circuit or circuitry EC21. The memory EC22 can also be referred to as a hardware memory EC22 or a memory circuit or circuitry EC22. The memory EC22 can also be referred to as a non-transitory computer-readable storage medium EC22. Namely, the electronic controller circuitry EC2 includes the non-transitory computer-readable storage medium EC22.

The electronic controller circuitry EC2 is configured to execute at least one control algorithm of the electric device FD. For example, the electronic controller circuitry EC2 is programed to execute at least one control algorithm of the electric device FD. The memory EC22 stores at least one program including at least one program instruction. The at least one program is read into the processor EC21, and thereby the at least one control algorithm of the electric device FD is executed based on the at least one program. The electric device FD can also be referred to as at least one computer FD.

The structure of the electronic controller circuitry EC2 is not limited to the above structure. The structure of the electronic controller circuitry EC2 is not limited to the processor EC21 and the memory EC22. The electronic controller circuitry EC2 can be realized by hardware alone or a combination of hardware and software. In the present embodiment, the processor EC21 and the memory EC22 are integrated as a single chip such as an application specific integrated circuit (ASIC) or a field programmable gate array (FPGA). However, the processor EC21 and the memory EC22 can be separate chips if needed or desired. The electronic controller circuitry EC2 can include the processor EC21, the memory EC22, the circuit board EC23, and the system bus EC24 if needed or desired. The electronic controller circuitry EC2 can be at least two electronic controllers which are separately provided.

The electronic controller circuitry EC2 can include at least two electronic controllers which are separately provided. The at least one control algorithm of the electric device FD can be executed by the at least two electronic controllers if needed or desired. The electronic controller circuitry EC2 can include at least two hardware processors which are separately provided. The electronic controller circuitry EC2 can include at least two hardware memories which are separately provided. The at least one control algorithm of the electric device FD can be executed by the at least two hardware processors if needed or desired. The at least one control algorithm of the electric device FD can be stored in the at least two hardware memories if needed or desired. The electronic controller circuitry EC2 can include at least two circuit boards which are separately provided if needed or desired. The electronic controller circuitry EC2 can include at least two system buses which are separately provided if needed or desired.

As seen in FIG. 2, the operating device 4 includes an electronic controller circuitry EC3. The electronic controller circuitry EC3 is electrically connected to the user operating interface 4A. The electronic controller circuitry EC3 is electrically connected to each of the electric switches SW1, SW2, SW3, and SW4. The electronic controller circuitry EC3 is configured to generate the control signal SG in response to the user gear-change input U received by the user operating interface 4A. The electronic controller circuitry EC3 is electrically connected to the power source holder 4H to receive electricity from the electric power source 4P via the power source holder 4H.

The electronic controller circuitry EC3 includes a processor EC31 and a memory EC32. The operating device 4 includes a circuit board EC33 and a system bus EC34. The processor EC31 is coupled to the memory EC32. The memory EC32 is coupled to the processor EC31. The processor EC31 and the memory EC32 are electrically mounted on the circuit board EC33. The processor EC31 is electrically connected to the memory EC32 via the circuit board EC33 and the system bus EC34. The memory EC32 is electrically connected to the processor EC31 via the circuit board EC33 and the system bus EC34. For example, the electronic controller circuitry EC3 includes a semiconductor. The processor EC31 includes a semiconductor. The memory EC32 includes a semiconductor. However, the electronic controller circuitry EC3 can be free of a semiconductor if needed or desired. The processor EC31 can be free of a semiconductor if needed or desired. The memory EC32 can be free of a semiconductor if needed or desired.

For example, the processor EC31 includes at least one of a central processing unit (CPU), a micro processing unit (MPU), and a memory controller. The memory EC32 is electrically connected to the processor EC31. For example, the memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC32 includes storage areas each having an address. The processor EC31 is configured to control the memory EC32 to store data in the storage areas of the memory EC32 and reads data from the storage areas of the memory EC32. The processor EC31 can also be referred to as a hardware processor EC31 or a processor circuit or circuitry EC31. The memory EC32 can also be referred to as a hardware memory EC32 or a memory circuit or circuitry EC32. The memory EC32 can also be referred to as a non-transitory computer-readable storage medium EC32. Namely, the electronic controller circuitry EC3 includes the non-transitory computer-readable storage medium EC32.

The electronic controller circuitry EC3 is configured to execute at least one control algorithm of the operating device 4. For example, the electronic controller circuitry EC3 is programed to execute at least one control algorithm of the operating device 4. The memory EC32 stores at least one program including at least one program instruction. The at least one program is read into the processor EC31, and thereby the at least one control algorithm of the operating device 4 is executed based on the at least one program. The operating device 4 can also be referred to as at least one computer 4.

The structure of the electronic controller circuitry EC3 is not limited to the above structure. The structure of the electronic controller circuitry EC3 is not limited to the processor EC31 and the memory EC32. The electronic controller circuitry EC3 can be realized by hardware alone or a combination of hardware and software. In the present embodiment, the processor EC31 and the memory EC32 are integrated as a single chip such as an application specific integrated circuit (ASIC) or a field programmable gate array (FPGA). However, the processor EC31 and the memory EC32 can be separate chips if needed or desired. The electronic controller circuitry EC3 can include the processor EC31, the memory EC32, the circuit board EC33, and the system bus EC34 if needed or desired. The electronic controller circuitry EC3 can be at least two electronic controllers which are separately provided.

The electronic controller circuitry EC3 can include at least two electronic controllers which are separately provided. The at least one control algorithm of the operating device 4 can be executed by the at least two electronic controllers if needed or desired. The electronic controller circuitry EC3 can include at least two hardware processors which are separately provided. The electronic controller circuitry EC3 can include at least two hardware memories which are separately provided. The at least one control algorithm of the operating device 4 can be executed by the at least two hardware processors if needed or desired. The at least one control algorithm of the operating device 4 can be stored in the at least two hardware memories if needed or desired. The electronic controller circuitry EC3 can include at least two circuit boards which are separately provided if needed or desired. The electronic controller circuitry EC3 can include at least two system buses which are separately provided if needed or desired.

As seen in FIG. 2, the communication device 6 includes an electronic controller circuitry EC4. The electronic controller circuitry EC4 is electrically connected to the user interface 6A to receive the user input U6 received by the user interface 6A. The electronic controller circuitry EC4 is electrically connected to the display 6B to control the display 6B to display information relating to the human-powered vehicle 2. The electronic controller circuitry EC4 is electrically connected to the power source holder 4H to receive electricity from the electric power source 4P via the power source holder 4H.

The electronic controller circuitry EC4 includes a processor EC41 and a memory EC42. The communication device 6 includes a circuit board EC43 and a system bus EC44. The processor EC41 is coupled to the memory EC42. The memory EC42 is coupled to the processor EC41. The processor EC41 and the memory EC42 are electrically mounted on the circuit board EC43. The processor EC41 is electrically connected to the memory EC42 via the circuit board EC43 and the system bus EC44. The memory EC42 is electrically connected to the processor EC41 via the circuit board EC43 and the system bus EC44. For example, the electronic controller circuitry EC4 includes a semiconductor. The processor EC41 includes a semiconductor. The memory EC42 includes a semiconductor. However, the electronic controller circuitry EC4 can be free of a semiconductor if needed or desired. The processor EC41 can be free of a semiconductor if needed or desired. The memory EC42 can be free of a semiconductor if needed or desired.

For example, the processor EC41 includes at least one of a central processing unit (CPU), a micro processing unit (MPU), and a memory controller. The memory EC42 is electrically connected to the processor EC41. For example, the memory EC42 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC42 includes storage areas each having an address. The processor EC41 is configured to control the memory EC42 to store data in the storage areas of the memory EC42 and reads data from the storage areas of the memory EC42. The processor EC41 can also be referred to as a hardware processor EC41 or a processor circuit or circuitry EC41. The memory EC42 can also be referred to as a hardware memory EC42 or a memory circuit or circuitry EC42. The memory EC42 can also be referred to as a non-transitory computer-readable storage medium EC42. Namely, the electronic controller circuitry EC4 includes the non-transitory computer-readable storage medium EC42.

The electronic controller circuitry EC4 is configured to execute at least one control algorithm of the communication device 6. For example, the electronic controller circuitry EC4 is programed to execute at least one control algorithm of the communication device 6. The memory EC42 stores at least one program including at least one program instruction. The at least one program is read into the processor EC41, and thereby the at least one control algorithm of the communication device 6 is executed based on the at least one program. The communication device 6 can also be referred to as at least one computer 6.

The structure of the electronic controller circuitry EC4 is not limited to the above structure. The structure of the electronic controller circuitry EC4 is not limited to the processor EC41 and the memory EC42. The electronic controller circuitry EC4 can be realized by hardware alone or a combination of hardware and software. In the present embodiment, the processor EC41 and the memory EC42 are integrated as a single chip such as an application specific integrated circuit (ASIC) or a field programmable gate array (FPGA). However, the processor EC41 and the memory EC42 can be separate chips if needed or desired. The electronic controller circuitry EC4 can include the processor EC41, the memory EC42, the circuit board EC43, and the system bus EC44 if needed or desired. The electronic controller circuitry EC4 can be at least two electronic controllers which are separately provided.

The electronic controller circuitry EC4 can include at least two electronic controllers which are separately provided. The at least one control algorithm of the communication device 6 can be executed by the at least two electronic controllers if needed or desired. The electronic controller circuitry EC4 can include at least two hardware processors which are separately provided. The electronic controller circuitry EC4 can include at least two hardware memories which are separately provided. The at least one control algorithm of the communication device 6 can be executed by the at least two hardware processors if needed or desired. The at least one control algorithm of the communication device 6 can be stored in the at least two hardware memories if needed or desired. The electronic controller circuitry EC4 can include at least two circuit boards which are separately provided if needed or desired. The electronic controller circuitry EC4 can include at least two system buses which are separately provided if needed or desired.

As seen in FIG. 2, the electric device RD further comprises communicator circuitry WC1. The electric device FD further comprises communicator circuitry WC2. The operating device 4 includes additional communicator circuitry WC3. The communication device 6 includes additional communicator circuitry WC4. The additional communicator circuitry WC3 can also be referred to as communicator circuitry WC3. The additional communicator circuitry WC4 can also be referred to as communicator circuitry WC4.

The communicator circuitry WC1 is configured to communicate with another communicator circuitry such as the communicator circuitry WC2, the additional communicator circuitry WC3, and the additional communicator circuitry WC4. The additional communicator circuitry WC3 is configured to communicate with another communicator circuitry such as the communicator circuitry WC1, the communicator circuitry WC2, and the additional communicator circuitry WC4. The additional communicator circuitry WC4 is configured to communicate with another communicator circuitry such as the communicator circuitry WC1, the communicator circuitry WC2, and the additional communicator circuitry WC3.

The communicator circuitry WC1 is electrically connected to the power source holder 34 to receive electricity from the electric power source 36 via the power source holder 34. The communicator circuitry WC2 is electrically connected to the power source holder 54 to receive electricity from the electric power source 56 via the power source holder 54. The additional communicator circuitry WC3 is electrically connected to the power source holder 4H to receive electricity from the electric power source 4P via the power source holder 4H. The communicator circuitry WC4 is electrically connected to the power source holder 6H to receive electricity from the electric power source 6P via the power source holder 6H.

For example, the additional communicator circuitry WC3 is configured to transmit information such as the control signals SG1, SG2, SG3, and SG4. The communicator circuitry WC1 is configured to receive information such as the control signals SG1, SG2, SG3, and SG4 from the additional communicator circuitry WC3 of the operating device 4.

The communicator circuitry WC2 is configured to receive information such as the control signals SG1, SG2, SG3, and SG4 from the additional communicator circuitry WC3 of the operating device 4 via the communicator circuitry WC1.

The additional communicator circuitry WC4 is configured to transmit information relating to the human-powered vehicle 2. The communicator circuitry WC1 is configured to receive the information relating to the human-powered vehicle 2 from the additional communicator circuitry WC4 of the communication device 6.

In the present embodiment, the communicator circuitry WC1 includes wireless communicator circuitry WC11. The communicator circuitry WC2 includes wireless communicator circuitry WC21. The additional communicator circuitry WC3 includes additional wireless communicator circuitry WC31. The additional communicator circuitry WC4 includes additional wireless communicator circuitry WC41.

The wireless communicator circuitry WC11 is configured to wirelessly communicate with another wireless communicator circuitry such as the wireless communicator circuitry WC21, the additional wireless communicator circuitry WC31, and the additional wireless communicator circuitry WC41.

The wireless communicator circuitry WC21 is configured to wirelessly communicate with another wireless communicator circuitry such as the wireless communicator circuitry WC11, the additional wireless communicator circuitry WC31, and the additional wireless communicator circuitry WC41.

The additional wireless communicator circuitry WC31 is configured to wirelessly communicate with another wireless communicator circuitry such as the wireless communicator circuitry WC11, the wireless communicator circuitry WC21, and the additional wireless communicator circuitry WC41.

The additional wireless communicator circuitry WC41 is configured to wirelessly communicate with another wireless communicator circuitry such as the wireless communicator circuitry WC11, the additional wireless communicator circuitry WC31, and the additional wireless communicator circuitry WC41.

The term "wireless communicator" or "wireless communicator circuitry" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, each of the wireless communicator circuitry WC11, the wireless communicator circuitry WC21, the additional wireless communicator circuitry WC31, and the additional wireless communicator circuitry WC41 is configured to at least receive a wireless signal. For example, each of the wireless communicator circuitry WC11, the wireless communicator circuitry WC21, the additional wireless communicator circuitry WC31, and the additional wireless communicator circuitry WC41 includes a two-way wireless transceiver that conducts two-way wireless communications using the wireless receiver for wirelessly receiving signals and a wireless transmitter for wirelessly transmitting signals.

In the present embodiment, each of the wireless communicator circuitry WC11, the wireless communicator circuitry WC21, the additional wireless communicator circuitry WC31, and the additional wireless communicator circuitry WC41 can use radio frequency (RF) signals, ultra-wide band communication signals, radio frequency identification (RFID), Wi-Fi (registered trademark), Zigbee (registered trademark), ANT+ (registered trademark), or Bluetooth (registered trademark) or any other type of communication protocols suitable for short range wireless communications as understood in the human-powered vehicle field.

It should also be understood that each of the wireless communicator circuitry WC11, the wireless communicator circuitry WC21, the additional wireless communicator circuitry WC31, and the additional wireless communicator circuitry WC41 can transmit the signals at a particular or randomly selected frequency and/or with an identifier such as a particular code, to distinguish the wireless control signal from other wireless control signals. In this way, each of the electric device RD, the electric device FD, the operating device 4, and the communication device 6 can recognize which control signals are to be acted upon and which control signals are not to be acted upon. Thus, each of the electric device RD, the electric device FD, the operating device 4, and the communication device 6 can ignore the control signals from other wireless communicators of other electric devices.

As seen in FIG. 2, the wireless communicator circuitry WC11 includes a signal transmitting circuit or circuitry, a signal receiving circuit or circuitry, and an antenna. The wireless communicator circuitry WC11 is configured to superimpose digital signals on carrier wave using the first communication protocol to wirelessly transmit signals. In the present embodiment, the wireless communicator circuitry WC11 is configured to encrypt signals using a cryptographic key to generate encrypted wireless signals. The wireless communicator circuitry WC11 is configured to transmit wireless signals via the antenna.

The wireless communicator circuitry WC11 is configured to receive wireless signals via the antenna. In the present embodiment, the wireless communicator circuitry WC11 is configured to decode the wireless signals to recognize signals transmitted from other wireless communicators. The wireless communicator circuitry WC11 is configured to decrypt the wireless signals using the cryptographic key.

As seen in FIG. 2, the wireless communicator circuitry WC21 includes a signal transmitting circuit or circuitry, a signal receiving circuit or circuitry, and an antenna. The wireless communicator circuitry WC21 is configured to superimpose digital signals on carrier wave using the first communication protocol to wirelessly transmit signals. In the present embodiment, the wireless communicator circuitry WC21 is configured to encrypt signals using a cryptographic key to generate encrypted wireless signals. The wireless communicator circuitry WC21 is configured to transmit wireless signals via the antenna.

The wireless communicator circuitry WC21 is configured to receive wireless signals via the antenna. In the present embodiment, the wireless communicator circuitry WC21 is configured to decode the wireless signals to recognize signals transmitted from other wireless communicators. The wireless communicator circuitry WC21 is configured to decrypt the wireless signals using the cryptographic key.

As seen in FIG. 2, the additional wireless communicator circuitry WC31 includes a signal transmitting circuit or circuitry, a signal receiving circuit or circuitry, and an antenna. The additional wireless communicator circuitry WC31 is configured to superimpose digital signals on carrier wave using the second communication protocol to wirelessly transmit signals. In the present embodiment, the additional wireless communicator circuitry WC31 is configured to encrypt signals using a cryptographic key to generate encrypted wireless signals. The additional wireless communicator circuitry WC31 is configured to transmit wireless signals via the antenna.

The additional wireless communicator circuitry WC31 is configured to receive wireless signals via the antenna. In the present embodiment, the additional wireless communicator circuitry WC31 is configured to decode the wireless signals to recognize signals transmitted from other wireless communicators. The additional wireless communicator circuitry WC31 is configured to decrypt the wireless signals using the cryptographic key.

As seen in FIG. 2, the additional wireless communicator circuitry WC41 includes a signal transmitting circuit or circuitry, a signal receiving circuit or circuitry, and an antenna. The additional wireless communicator circuitry WC41 is configured to superimpose digital signals on carrier wave using the second communication protocol to wirelessly transmit signals. In the present embodiment, the additional wireless communicator circuitry WC41 is configured to encrypt signals using a cryptographic key to generate encrypted wireless signals. The additional wireless communicator circuitry WC41 is configured to transmit wireless signals via the antenna.

The additional wireless communicator circuitry WC41 is configured to receive wireless signals via the antenna. In the present embodiment, the additional wireless communicator circuitry WC41 is configured to decode the wireless signals to recognize signals transmitted from other wireless communicators. The additional wireless communicator circuitry WC41 is configured to decrypt the wireless signals using the cryptographic key.

As seen in FIG. 2, the electronic controller circuitry EC1 is configured to control the communicator circuitry WC1 to communicate with another communicator circuitry such as the communicator circuitry WC2, the additional communicator circuitry WC3, and the additional communicator circuitry WC4. The electronic controller circuitry EC1 is configured to control the wireless communicator circuitry WC11 to wirelessly communicate with another wireless communicator circuitry such as the wireless communicator circuitry WC21, the additional wireless communicator circuitry WC31, and the additional wireless communicator circuitry WC41. The communicator circuitry WC1 is configured to be paired with another communicator such as the communicator circuitry WC2, the additional communicator circuitry WC3, and the additional communicator circuitry WC4 through a pairing process. The wireless communicator circuitry WC11 is configured to be paired with another wireless communicator such as the wireless communicator circuitry WC21, the additional wireless communicator circuitry WC31, and the additional wireless communicator circuitry WC41 through a pairing process.

As seen in FIG. 2, the electronic controller circuitry EC2 is configured to control the communicator circuitry WC2 to communicate with another communicator circuitry such as the communicator circuitry WC1, the additional communicator circuitry WC3, and the additional communicator circuitry WC4. The electronic controller circuitry EC2 is configured to control the wireless communicator circuitry WC21 to wirelessly communicate with another wireless communicator circuitry such as the wireless communicator circuitry WC11, the additional wireless communicator circuitry WC31, and the additional wireless communicator circuitry WC41. The communicator circuitry WC2 is configured to be paired with another communicator such as the communicator circuitry WC1, the additional communicator circuitry WC3, and the additional communicator circuitry WC4 through a pairing process. The wireless communicator circuitry WC21 is configured to be paired with another wireless communicator such as the wireless communicator circuitry WC11, the additional wireless communicator circuitry WC31, and the additional wireless communicator circuitry WC41 through a pairing process.

As seen in FIG. 2, the electronic controller circuitry EC3 is configured to control the additional communicator circuitry WC3 to communicate with another communicator circuitry such as the communicator circuitry WC1, the communicator circuitry WC2, and the additional communicator circuitry WC4. The electronic controller circuitry EC3 is configured to control the additional wireless communicator circuitry WC31 to wirelessly communicate with another wireless communicator circuitry such as the wireless communicator circuitry WC11, the wireless communicator circuitry WC21, and the additional wireless communicator circuitry WC41. The additional communicator circuitry WC3 is configured to be paired with another communicator such as the communicator circuitry WC1, the communicator circuitry WC2, and the additional communicator circuitry WC4 through a pairing process. The additional wireless communicator circuitry WC31 is configured to be paired with another wireless communicator such as the wireless communicator circuitry WC11, the wireless communicator circuitry WC21, and the additional wireless communicator circuitry WC41 through a pairing process.

As seen in FIG. 2, the electronic controller circuitry EC4 is configured to control the communicator circuitry WC4 to communicate with another communicator circuitry such as the communicator circuitry WC1, the communicator circuitry WC2, and the additional communicator circuitry WC3. The electronic controller circuitry EC4 is configured to control the additional wireless communicator circuitry WC41 to wirelessly communicate with another wireless communicator circuitry such as the wireless communicator circuitry WC11, the wireless communicator circuitry WC21, and the additional wireless communicator circuitry WC31. The communicator circuitry WC4 is configured to be paired with another communicator such as the communicator circuitry WC1, the communicator circuitry WC2, and the additional communicator circuitry WC3 through a pairing process. The additional wireless communicator circuitry WC41 is configured to be paired with another wireless communicator such as the wireless communicator circuitry WC11, the wireless communicator circuitry WC21, and the additional wireless communicator circuitry WC31 through a pairing process.

As seen in FIG. 2, the communicator circuitry WC1 is electrically mounted on the circuit board EC13. The communicator circuitry WC1 is electrically mounted on the circuit board EC13. The communicator circuitry WC1 is electrically connected to the processor EC11 and the memory EC12 with the circuit board EC13 and the system bus EC14. However, the communicator circuitry WC1 can be electrically mounted on another circuit board in a case where the electronic controller circuitry EC1 includes at least two circuit boards. The communicator circuitry WC1 can be electrically mounted on another circuit board in a case where the electronic controller circuitry EC1 includes at least two circuit boards. The communicator circuitry WC1 can be electrically mounted on an electric component other than a circuit board.

At least one of the processor EC11, the memory EC12, and the communicator circuitry WC1 can be integrally provided with another of the processor EC11, the memory EC12, and the communicator circuitry WC1 as a single chip if needed or desired. At least one of the processor EC11, the memory EC12, and the communicator circuitry WC1 can be a separate chip from another of the processor EC11, the memory EC12, and the communicator circuitry WC1 if needed or desired. The communicator circuitry WC1 can include at least two separate chips if needed or desired. The wireless communicator circuitry WC11 can include at least two separate chips if needed or desired. For example, the wireless communicator circuitry WC11 can include: a first chip configured to wirelessly communicate with one of the operating device 4, the communication device 6, and the electric device FD; and a second chip configured to wirelessly communicate with another of the operating device 4, the communication device 6, and the electric device FD. The first chip and the second chip can use different protocols.

As seen in FIG. 2, the communicator circuitry WC2 is electrically mounted on the circuit board EC23. The communicator circuitry WC2 is electrically mounted on the circuit board EC23. The communicator circuitry WC2 is electrically connected to the processor EC21 and the memory EC22 with the circuit board EC23 and the system bus EC24. However, the communicator circuitry WC2 can be electrically mounted on another circuit board in a case where the electronic controller circuitry EC2 includes at least two circuit boards. The communicator circuitry WC2 can be electrically mounted on another circuit board in a case where the electronic controller circuitry EC2 includes at least two circuit boards. The communicator circuitry WC2 can be electrically mounted on an electric component other than a circuit board.

At least one of the processor EC21, the memory EC22, and the communicator circuitry WC2 can be integrally provided with another of the processor EC21, the memory EC22, and the communicator circuitry WC2 as a single chip if needed or desired. At least one of the processor EC21, the memory EC22, and the communicator circuitry WC2 can be a separate chip from another of the processor EC21, the memory EC22, and the communicator circuitry WC2 if needed or desired.

As seen in FIG. 2, the additional communicator circuitry WC3 is electrically mounted on the circuit board EC33. The additional communicator circuitry WC3 is electrically mounted on the circuit board EC33. The additional communicator circuitry WC3 is electrically connected to the processor EC31 and the memory EC32 with the circuit board EC33 and the system bus EC34. However, the additional communicator circuitry WC3 can be electrically mounted on another circuit board in a case where the electronic controller circuitry EC3 includes at least two circuit boards. The additional communicator circuitry WC3 can be electrically mounted on another circuit board in a case where the electronic controller circuitry EC3 includes at least two circuit boards. The additional communicator circuitry WC3 can be electrically mounted on an electric component other than a circuit board.

At least one of the processor EC31, the memory EC32, and the additional communicator circuitry WC3 can be integrally provided with another of the processor EC31, the memory EC32, and the additional communicator circuitry WC3 as a single chip if needed or desired. At least one of the processor EC31, the memory EC32, and the additional communicator circuitry WC3 can be a separate chip from another of the processor EC31, the memory EC32, and the additional communicator circuitry WC3 if needed or desired.

As seen in FIG. 2, the communicator circuitry WC4 is electrically mounted on the circuit board EC43. The communicator circuitry WC4 is electrically mounted on the circuit board EC43. The communicator circuitry WC4 is electrically connected to the processor EC41 and the memory EC42 with the circuit board EC43 and the system bus EC44. However, the communicator circuitry WC4 can be electrically mounted on another circuit board in a case where the electronic controller circuitry EC4 includes at least two circuit boards. The communicator circuitry WC4 can be electrically mounted on another circuit board in a case where the electronic controller circuitry EC4 includes at least two circuit boards. The communicator circuitry WC4 can be electrically mounted on an electric component other than a circuit board.

At least one of the processor EC41, the memory EC42, and the communicator circuitry WC4 can be integrally provided with another of the processor EC41, the memory EC42, and the communicator circuitry WC4 as a single chip if needed or desired. At least one of the processor EC41, the memory EC42, and the communicator circuitry WC4 can be a separate chip from another of the processor EC41, the memory EC42, and the communicator circuitry WC4 if needed or desired.

As seen in FIG. 2, the communicator circuitry WC1 of the electric device RD includes wired communicator circuitry WC12. The communicator circuitry WC2 of the electric device FD includes wired communicator circuitry WC22. The wired communicator circuitry WC12 is configured to communicate with another wired communicator circuitry such as the wired communicator circuitry WC22 via an electric cable. The wired communicator circuitry WC22 is configured to communicate with another wired communicator circuitry such as the wired communicator circuitry WC12 via an electric cable.

The electric device RD includes a connector port CN1 to which an electric cable is to be electrically connected. The connector port CN1 is configured to be detachably and reattachably connected to the electric cable. The wired communicator circuitry WC12 is electrically connected to the connector port CN1.

The electric device FD includes a connector port CN2 to which an electric cable is to be electrically connected. The connector port CN2 is configured to be detachably and reattachably connected to the electric cable. The wired communicator circuitry WC22 is electrically connected to the connector port CN2.

For example, the wired communicator circuitry WC12 is configured to communicate with another wired communicator circuitry such as the wired communicator circuitry WC22 via the electric cable using power line communication technology. The wired communicator circuitry WC22 is configured to communicate with another wired communicator circuitry such as the wired communicator circuitry WC12 via the electric cable using power line communication technology. Power line communication (PLC) carries data on a conductor that is also used simultaneously for electric power transmission or electric power distribution to devices such as the electric device RD and the electric device FD.

For example, the electric cable includes a ground line and a voltage line that are detachably connected to a serial bus that is formed by communication interfaces. In the present embodiment, the wired communicator circuitry WC12 is configured to communicate with another wired communicator circuitry such as the wired communicator circuitry WC22 through the voltage line using the PLC technology. The wired communicator circuitry WC12 is configured to superimpose signals on a power source voltage applied from the electric device FD to the electric cable. The wired communicator circuitry WC12 is configured to receive a signal from the electronic controller circuitry EC1 and is configured to superimpose the signal on the power source voltage. The wired communicator circuitry WC12 is configured to separate, from the power source voltage, signals superimposed on the power source voltage of the electric cable. The wired communicator circuitry WC12 is configured to transmit to the electronic controller circuitry EC1 signals separated from the power source voltage. At least one of the wired communicator circuitry WC12 and the connector port CN1 can be omitted from the electric device RD in a case where the electric device RD includes the power source holder 34 and the electric power source 36.

In the present embodiment, the wired communicator circuitry WC22 is configured to communicate with another wired communicator circuitry such as the wired communicator circuitry WC12 through the voltage line using the PLC technology. The wired communicator circuitry WC22 is configured to superimpose signals on the power source voltage applied from the electric device FD to the electric cable. The wired communicator circuitry WC22 is configured to receive a signal from the electronic controller circuitry EC3 and is configured to superimpose the signal on the power source voltage. The wired communicator circuitry WC22 is configured to separate, from the power source voltage, signals superimposed on the power source voltage of the electric cable. The wired communicator circuitry WC22 is configured to transmit to the electronic controller circuitry EC3 signals separated from the power source voltage. At least one of the wired communicator circuitry WC22 and the connector port CN2 can be omitted from the electric device FD in a case where the electric device FD includes the power source holder 54 and the electric power source 56.

As seen in FIG. 2, the electric device RD includes an actuator driver 60. The actuator driver 60 is electrically connected to the electrical actuator 33 and the electronic controller circuitry EC1. The actuator driver 60 is configured to control the electrical actuator 33 based on a command generated by the electronic controller circuitry EC1. The electronic controller circuitry EC1 is configured to generate the command based on the control signal SG. The electrical actuator 33 is configured to generate the actuation force in response to the command generated by the actuator driver 60.

The electric device RD includes a position sensor 62. The position sensor 62 is configured to obtain a position of the chain guide 14 relative to the base member 12. Examples of the position sensor 62 includes a potentiometer, a magnetic sensor, and an optical sensor.

The electronic controller circuitry EC1 is electrically connected to the position sensor 62 to obtain the position obtained by the position sensor 62. The electronic controller circuitry EC1 is configured to control the motor unit 32 via the actuator driver 60 based on the position obtained by the position sensor 62.

As seen in FIG. 2, the electric device RD includes an actuator driver 70. The actuator driver 70 is electrically connected to the electrical actuator 53 and the electronic controller circuitry EC2. The actuator driver 70 is configured to control the electrical actuator 53 based on a command generated by the electronic controller circuitry EC2. The electronic controller circuitry EC2 is configured to generate the command based on the control signal SG. The electrical actuator 53 is configured to generate the actuation force in response to the command generated by the actuator driver 70.

The electric device RD includes a position sensor 72. The position sensor 72 is configured to obtain a position of the chain guide 44 relative to the base member 42. Examples of the position sensor 72 includes a potentiometer, a magnetic sensor, and an optical sensor.

The electronic controller circuitry EC2 is electrically connected to the position sensor 72 to obtain the position obtained by the position sensor 72. The electronic controller circuitry EC2 is configured to control the motor unit 32 via the actuator driver 70 based on the position obtained by the position sensor 72.

Figure 6:
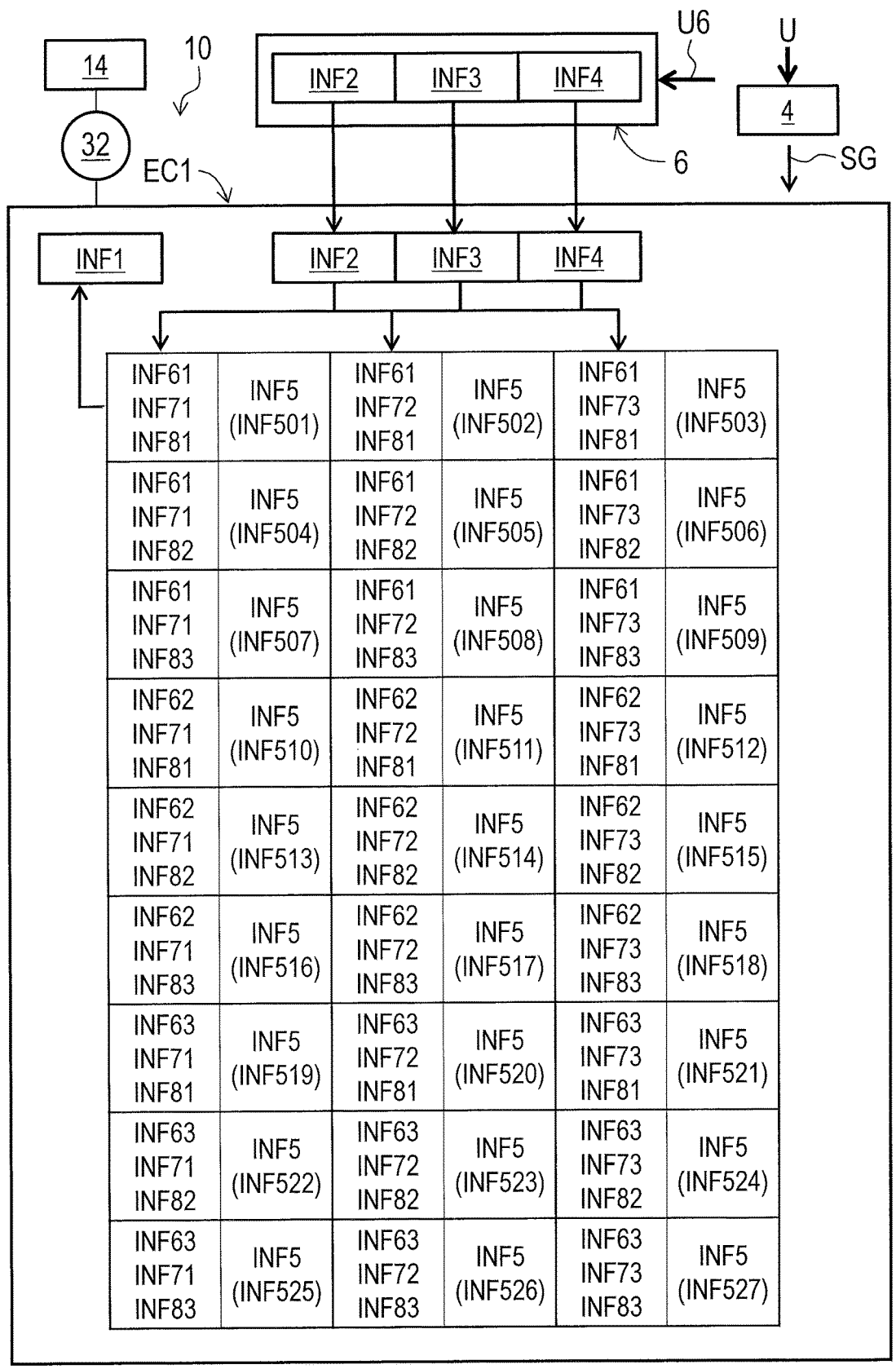
FIG. 6 is a schematic block diagram of the electric device illustrated in FIG. 2, with gear changing information.

As seen in FIG. 6, the electronic controller circuitry EC1 is configured to perform a gear shift control based on setting information INF1. The electronic controller circuitry EC1 is configured to store the setting information INF1 in the memory EC12. The setting information INF1 includes at least two stop positions of the chain guide 14. The at least two stop positions of the chain guide 14 correspond to at least two sprockets of the sprocket assembly RS.

The electronic controller circuitry EC1 is configured to control the motor unit 32 via the actuator driver 60 to move the chain guide 14 from one of the at least two stop positions to another of the at least two stop positions based on the control signal SG. The electronic controller circuitry EC1 is configured to store a current stop position of the chain guide 14 obtained by the position sensor 62. The electronic controller circuitry EC1 is configured to determine a gear-change direction of the chain guide 14 based on the control signal SG. The electronic controller circuitry EC1 is configured to select, as a target stop position, one of the at least two stop positions stored in the memory EC12 based on the current stop position and the gear-change direction. The electronic controller circuitry EC1 is configured to control the motor unit 32 via the actuator driver 60 to move the chain guide 14 from the current stop position to the target stop position.

Figure 7:
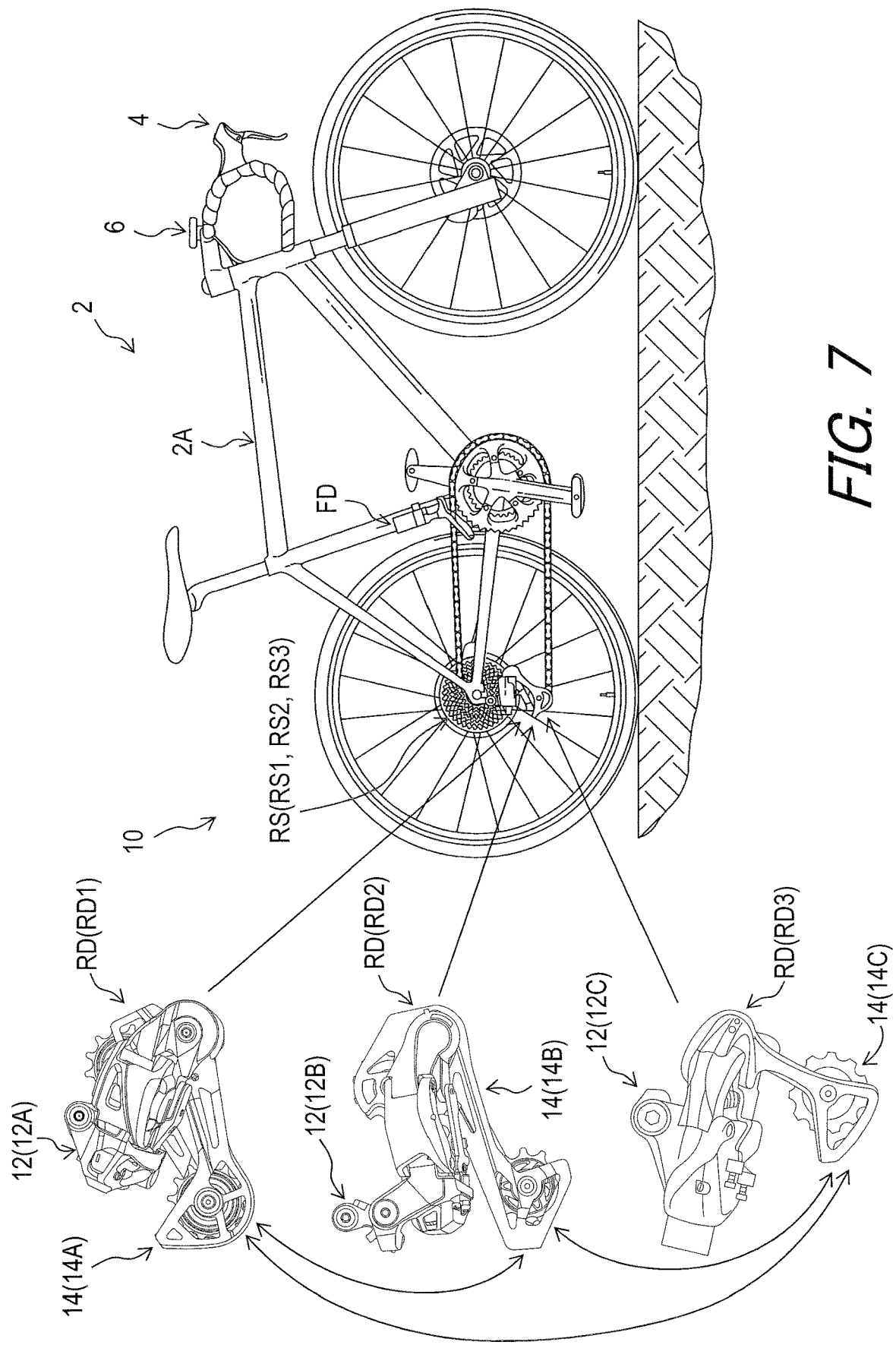
FIG. 7 is a side elevational view of at least two different electric devices which can be applied to the human-powered vehicle illustrated in FIG. 1.

As seen in FIG. 7, examples of the electric device RD include electric devices RD1, RD2, and RD3. The electric devices RD1, RD2, and RD3 have different specifications. Examples of the base member 12 include base members 12A, 12B, and 12C. Examples of the chain guide 14 include chain guides 14A, 14B, and 14C. Examples of the linkage structure 16 include linkage structures 16A, 16B, and 16C. The electric device RD1 includes the base member 12A, the chain guide 14A, and the linkage structure 16A. The electric device RD2 includes the base member 12B, the chain guide 14B, and the linkage structure 16B. The electric device RD3 includes the base member 12C, the chain guide 14C, and the linkage structure 16C.

For example, the chain guide 14A of the electric device RD1 can be replaced with any one of the chain guide 14B of the electric device RD2 and the chain guide 14C of the electric device RD3. The chain guide 14B of the electric device RD2 can be replaced with any one of the chain guide 14A of the electric device RD1 and the chain guide 14C of the electric device RD3. The chain guide 14C of the electric device RD3 can be replaced with any one of the chain guide 14A of the electric device RD1 and the chain guide 14B of the electric device RD2.

Figure 8:
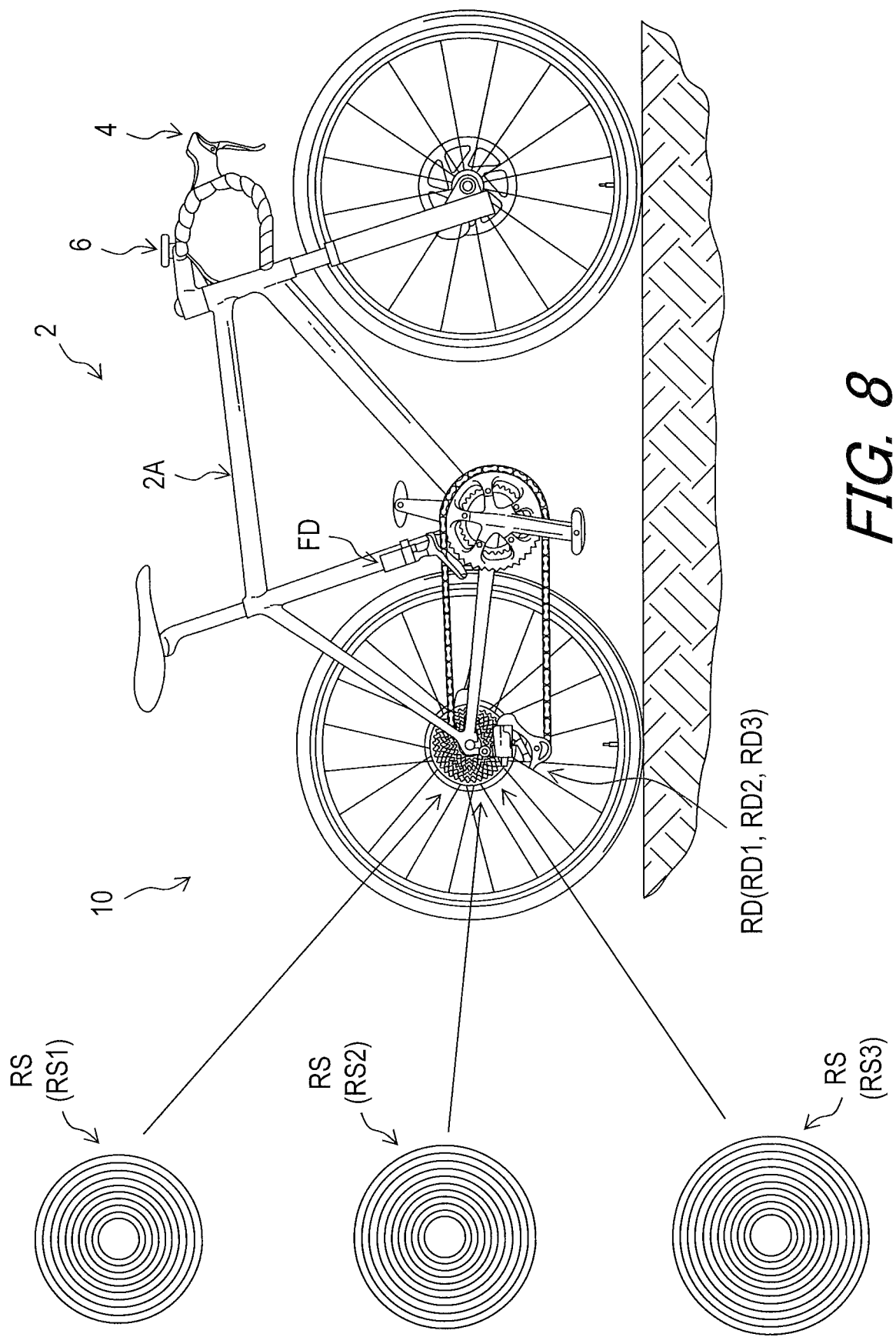
FIG. 8 is a side elevational view of at least two different sprocket assemblies which can be applied to the human-powered vehicle illustrated in FIG. 1.

As seen in FIG. 8, examples of the sprocket assembly RS include sprocket assemblies RS1, RS2, and RS3. The sprocket assemblies RS1, RS2, and RS3 have different specifications. The sprocket assembly RS1 has a total number of sprockets. The sprocket assembly RS2 has a total number of sprockets. The sprocket assembly RS3 has a total number of sprockets. The total number of sprockets of the sprocket assembly RS1 is different from each of the total number of sprockets of the sprocket assembly RS2 and the total number of sprockets of the sprocket assembly RS3. The total number of sprockets of the sprocket assembly RS2 is different from the total number of sprockets of the sprocket assembly RS3. The total number of the sprockets of the sprocket assembly RS1 can be equal to at least one of the total number of the sprockets of the sprocket assembly RS2 and the total number of the sprockets of the sprocket assembly RS3 if needed or desired. The total number of the sprockets of the sprocket assembly RS2 can be equal to the total number of the sprockets of the sprocket assembly RS3 if needed or desired.

Each of the sprockets of the sprocket assembly RS1 has a total number of sprocket teeth. Each of the sprockets of the sprocket assembly RS2 has a total number of sprocket teeth. Each of the sprockets of the sprocket assembly RS3 has a total number of sprocket teeth. A combination of the total numbers of the sprocket assembly RS1 is different from a combination of the total numbers of the sprocket assembly RS2 and a combination of the total numbers of the sprocket assembly RS3. The combination of the total numbers of the sprocket assembly RS2 is different from the combination of the total numbers of the sprocket assembly RS3.

For example, the sprocket assembly RS1 can be used with any one of the electric devices RD1, RD2, and RD3. The sprocket assembly RS2 can be used with any one of the electric devices RD1, RD2, and RD3. The sprocket assembly RS3 can be used with any one of the electric devices RD1, RD2, and RD3.

Depending on a combination of the electric device RD and the sprocket assembly RS which are mounted to the vehicle body 2A, however, at least two stop positions of one of the electric devices RD1, RD2, and RD3 used with one of the sprocket assemblies RS1, RS2, and RS3 can be different from at least two stop positions of another of the electric devices RD1, RD2, and RD3 used with the one or another of the sprocket assemblies RS1, RS2, and RS3.

Depending on the chain guide 14 coupled to the base member 12 of the electric device RD, at least two stop positions of the electric device RD including one of the chain guides 14A, 14B, and 14C can be different from at least two stop position of the electric device RD including another of the chain guides 14A, 14B, and 14C.

As discussed below, the electric device RD is configured to change the setting information INF1 based on the specifications of the electric device RD and the sprocket assembly RS.

As seen in FIG. 2, the electronic controller circuitry EC1 is configured to obtain at least one of the chain guide information INF2 and the sprocket information INF3. The electronic controller circuitry EC1 is configured to obtain the transmission model information INF4 of each of at least two different electric devices.

For example, the electronic controller circuitry EC1 is configured to obtain the at least one of the chain guide information INF2 and the sprocket information INF3 from the communication device 6. The electronic controller circuitry EC1 is configured to obtain the transmission model information INF4 from the communication device 6.

The electronic controller circuitry EC1 is configured to obtain, via the communicator circuitry WC1, the user input U6 received by the communication device 6. The user input U6 includes the at least one of the chain guide information INF2 and the sprocket information INF3. The user input U6 includes the transmission model information INF4.

The communication device 6 is configured to output the at least one of the chain guide information INF2 and the sprocket information INF3. The communication device 6 is configured to output the transmission model information INF4. The communication device 6 is configured to output the at least one of chain guide information INF2 and sprocket information INF3 in response to the user input U6. The communication device 6 is configured to output the transmission model information INF4 in response to the user input U6.

For example, the communication device 6 is configured to wirelessly transmit the at least one of chain guide information INF2 and sprocket information INF3 to the electric device RD in response to the user input U6. The communication device 6 is configured to wirelessly transmit the transmission model information INF4 to the electric device RD in response to the user input U6.

The communicator circuitry WC1 is configured to receive the at least one of the chain guide information INF2 and the sprocket information INF3 from the communication device 6. The communicator circuitry WC1 is configured to receive the transmission model information INF4 from the communication device 6.

The communicator circuitry WC1 is configured to wirelessly receive the at least one of the chain guide information INF2 and the sprocket information INF3 from the communication device 6. The wireless communicator circuitry WC11 is configured to wirelessly receive the at least one of the chain guide information INF2 and the sprocket information INF3 from the communication device 6.

The communicator circuitry WC1 is configured to wirelessly receive the transmission model information INF4 from the communication device 6. The wireless communicator circuitry WC11 is configured to wirelessly receive the transmission model information INF4 from the communication device 6.

Figure 9:
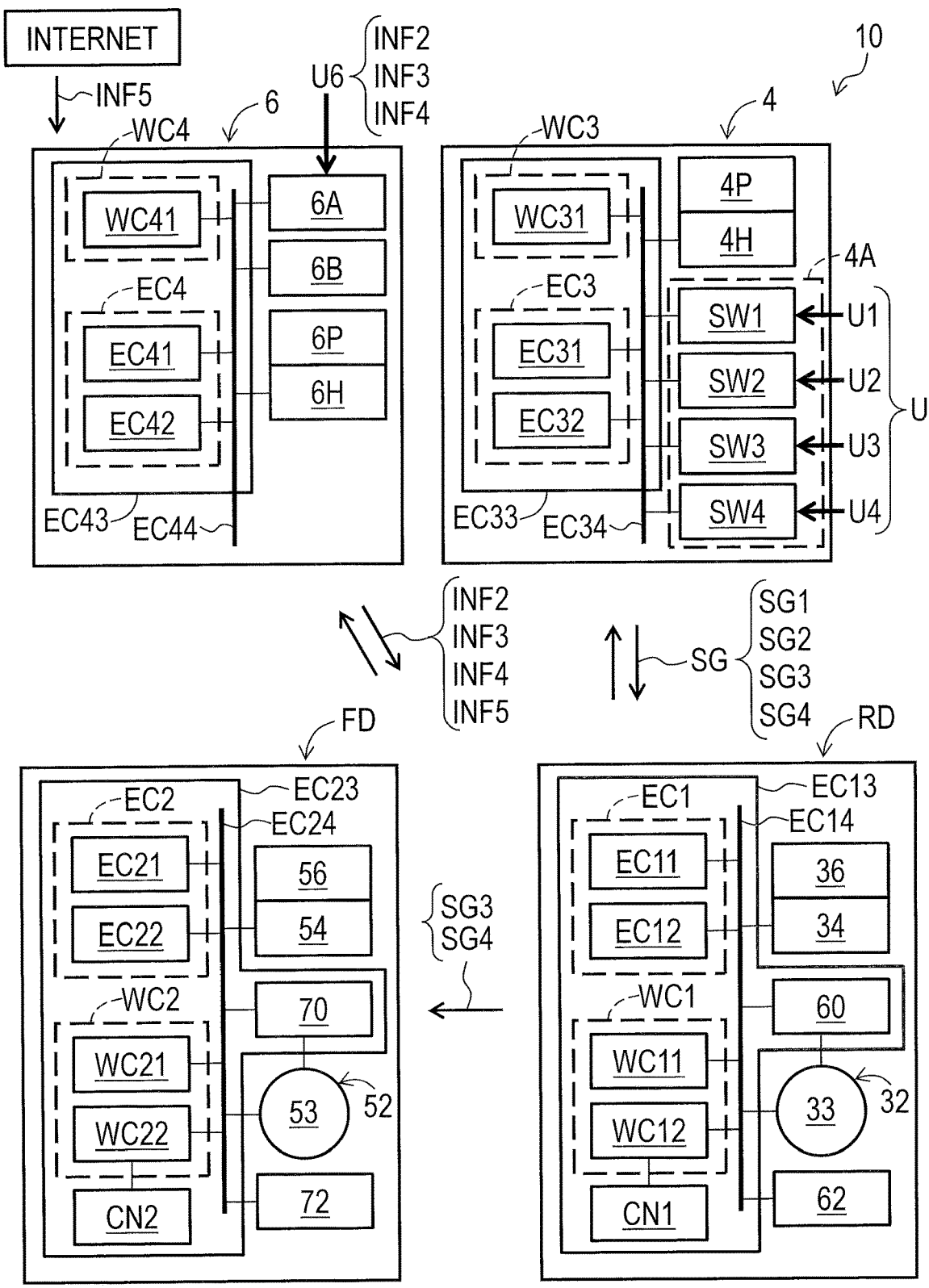
FIG. 9 is a schematic block diagram of an electric device in accordance with a modification.

As seen in FIG. 6, the electronic controller circuitry EC1 is configured to store at least two pieces of gear changing information INF5 in the memory EC12. For example, the electronic controller circuitry EC1 is configured to store at least two pieces of gear changing information INF5 in the memory EC12 in advance. The electronic controller circuitry EC1 can be configured to store the at least two pieces of the gear changing information INF5 in the memory EC12 before first receipt of the chain guide information INF2, the sprocket information INF3, and the transmission model information INF4. The electronic controller circuitry EC1 is configured to store the at least two pieces of the gear changing information INF5 in the memory EC12 before shipment or product sales of the electric device RD. However, the electronic controller circuitry EC1 can be configured to obtain the at least two pieces of the gear changing information INF5 from another device or an internet network if needed or desired. For example, the electronic controller circuitry EC1 can be configured to obtain the at least two pieces of the gear changing information INF5 from the communication device 6 if needed or desired. In such a modification, as seen in FIG. 9, the communication device 6 can be configured to obtain the at least two pieces of the gear changing information INF5 through the internet network. The electronic controller circuitry EC1 can be configured to obtain the at least two pieces of the gear changing information INF5 from the communication device 6 via the communicator circuitry WC1.

As seen in FIG. 6, the electronic controller circuitry EC1 is configured to set one of the at least two pieces of the gear changing information INF5 as the setting information INF1 based on the at least one of the chain guide information INF2 and the sprocket information INF3. The electronic controller circuitry EC1 is configured to set one of the at least two pieces of the gear changing information INF5 as the setting information INF1 in response to receipt of the at least one of the chain guide information INF2 and the sprocket information INF3 transmitted from the communication device 6.

Each of the at least two pieces of the gear changing information INF5 includes at least two stop positions of the chain guide 14 respectively corresponding to at least two sprockets of the sprocket assembly RS.

Figure 10:
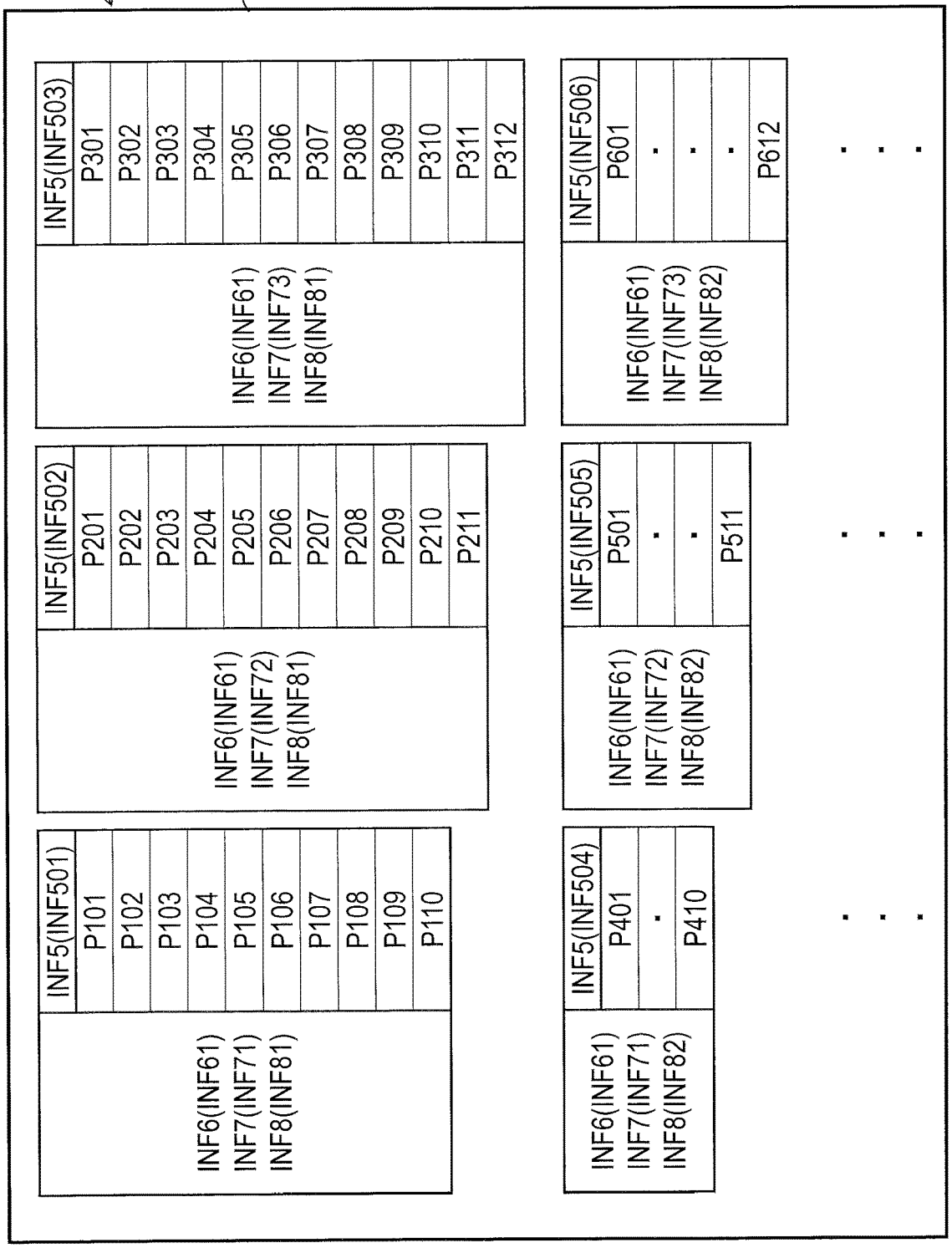
FIG. 10 is a schematic view showing the gear changing information.

As seen in FIG. 10, in the present embodiment, the at least two pieces of the gear changing information INF5 includes first gear changing information INF501 and second gear changing information INF502. The first gear changing information INF501 includes at least two first stop positions of the chain guide 14. The second gear changing information INF502 includes at least two second stop positions of the chain guide 14. A total number of the at least two first stop positions is different from a total number of the at least two second stop positions.

The at least two pieces of the gear changing information INF5 includes third gear changing information INF503 to twenty-seventh gear changing information INF527. The third gear changing information INF503 includes at least two third stop positions of the chain guide 14. A total number of the at least two third stop positions can be different from the total number of the at least two first stop positions. The total number of the at least two third stop positions can be different from the total number of the at least two second stop positions. Each of the fourth to twenty-seventh gear changing information INF504 to INF527 can have at least two stop positions of the chain guide 14 as with the third gear changing information INF503.

For example, the total number of sprockets of the sprocket assembly RS1 is 10. The total number of sprockets of the sprocket assembly RS2 is 11. The total number of sprockets of the sprocket assembly RS3 is 12. The first gear changing information INF501 includes ten first stop positions P101 to P110 of the chain guide 14 respectively corresponding to the ten sprockets of the sprocket assembly RS1. The second gear changing information INF51 includes eleven second stop positions P201 to P211 of the chain guide 14 respectively corresponding to the eleven sprockets of the sprocket assembly RS2. The third gear changing information INF503 includes ten third stop positions P301 to P312 of the chain guide 14 respectively corresponding to the twelve sprockets of the sprocket assembly RS3. Each of the fourth to twenty-seventh gear changing information INF504 to INF527 has at least two stop positions as with the first to third gear changing information INF501 to INF503. At least one of the first to twenty-seventh gear changing information INF501 to INF527 can include a stop position which is the same as or different from a stop position included in another of the first to twenty-seventh gear changing information INF501 to INF527.

The chain guide information INF2 includes at least one of: chain-guide model information of each of at least two different chain guides; and a reference distance of each of at least two different chain guides. For example, the chain-guide model information includes a model number of a chain guide. The reference distance include a distance which allows the user to identify a chain guide.

As seen in FIG. 4, the reference distance can include a distance DS1 defined between the pivot axis PA of one of the at least two different chain guides 14A, 14B, and 14C and the rotational axis RA1 of the pulley 24 of the one of the at least two different chain guides 14A, 14B, and 14C. The reference distance can include a distance DS2 defined between the pivot axis PA of one of the at least two different chain guides 14A, 14B, and 14C and the rotational axis RA2 of the pulley 26 of the one of the at least two different chain guides 14A, 14B, and 14C. The reference distance can include a distance DS3 defined between the first rotational axis RA1 of the first pulley 24 of one of the at least two different chain guides 14A, 14B, and 14C and the second rotational axis RA2 of the second pulley 26 of the one of the at least two different chain guides 14A, 14B, and 14C.

For example, the distance DS1 of one of the chain guides 14A, 14B, and 14C is different from the distance DS1 of another of the chain guides 14A, 14B, and 14C. The distance DS2 of one of the chain guides 14A, 14B, and 14C is different from the distance DS2 of another of the chain guides 14A, 14B, and 14C. The distance DS3 of one of the chain guides 14A, 14B, and 14C is different from the distance DS3 of another of the chain guides 14A, 14B, and 14C. Thus, the chain guides 14A, 14B, and 14C can be differentiated based on at least one of the distances DS1, DS2, and DS3.

Figure 11:
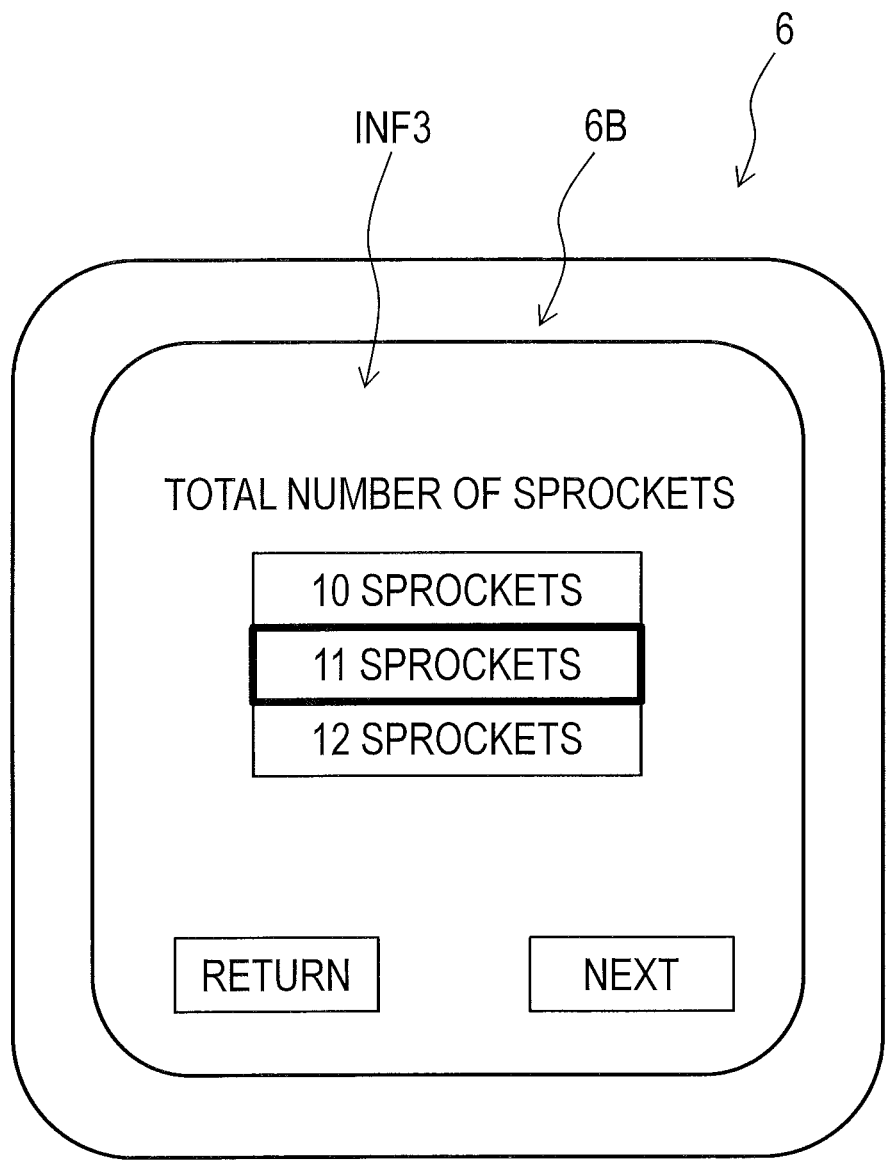
FIG. 11 is a plan view of a communication device of the human-powered vehicle illustrated in FIG. 1, with sprocket information displayed.
Figure 12:
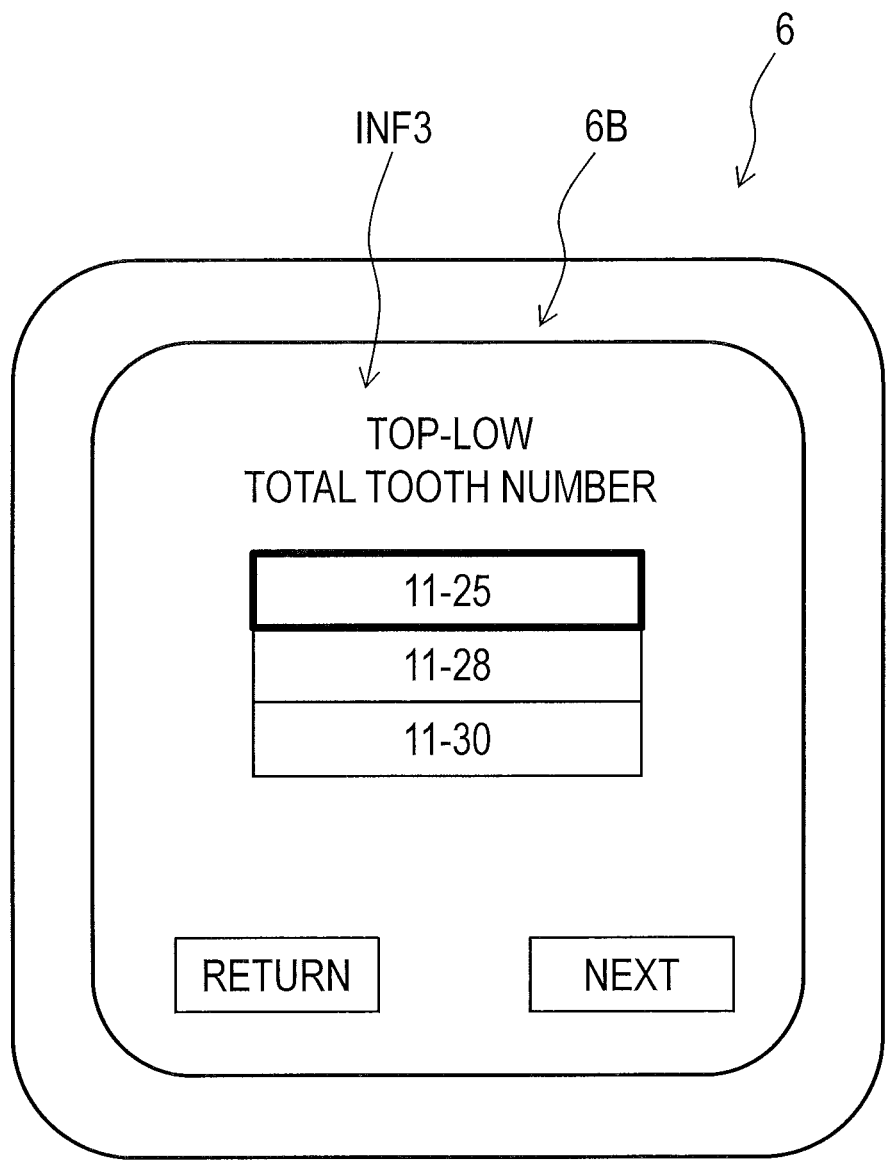
FIG. 12 is a plan view of the communication device of the human-powered vehicle illustrated in FIG. 1, with the sprocket information displayed.

As seen in FIGS. 11 and 12, the sprocket information INF3 includes at least one of: sprocket model information of each of at least two different sprocket assemblies; a total number of at least two sprockets included in each of at least two different sprocket assemblies; and a combination of at least two total tooth numbers of at least two sprockets included in each of at least two different sprocket assemblies. For example, the sprocket model information includes a model number of a sprocket. The total tooth number is a total number of sprocket teeth of a sprocket.

For example, the sprocket information INF3 includes at least one of: the sprocket model information of each of the different sprocket assemblies RS1, RS2, and RS3; a total number of at least two sprockets included in each of the different sprocket assemblies RS1, RS2, and RS3; and a combination of at least two total tooth numbers of at least two sprockets included in each of the different sprocket assemblies RS1, RS2, and RS3. Namely, the at least two pieces of the gear changing information INF5 respectively correspond to at least two different sprocket assemblies RS1, RS2, and RS3.

As seen in FIG. 11, the sprocket information INF3 includes the total number of at least two sprockets included in each of the different sprocket assemblies such as the sprocket assemblies RS1, RS2, and RS3. The display 6B of the communication device 6 is configured to display at least one total number of sprockets. The communication device 6 is configured to allow the user to select one of the at least one total number of sprockets. The communication device 6 is configured to store selected one of the at least one total number of the sprockets. The total number of at least two sprockets can be input using the user interface 6A rather than the selection of options displayed in the display 6B. The display 6B can be configured to display an error message in a case where a wrong total number is input using the user interface 6A. The communication device 6 can be configured to automatically select the total number which is closest to the wrong total number which is input to the communication device 6.

As seen in FIG. 12, the sprocket information INF3 includes the combination of at least two total tooth numbers of at least two sprockets included in each of at least two different sprocket assemblies such as the sprocket assemblies RS1, RS2, and RS3. The display 6B of the communication device 6 is configured to display at least one combination of at least two total tooth numbers. The communication device 6 is configured to allow the user to select one of the at least one combination of at least two total tooth numbers. The communication device 6 is configured to store selected one of the at least one combination of at least two total tooth numbers. The selection screen illustrated in FIG. 11 can be omitted in a case where the total number of at least two sprockets can be identified based on the combination of at least two total tooth numbers of at least two sprockets.

The sprocket information INF3 can include the sprocket model information of each of the different sprocket assemblies such as the sprocket assemblies RS1, RS2, and RS3. The display 6B of the communication device 6 can be configured to display the sprocket model information of each of the different sprocket assemblies.

Figure 13:
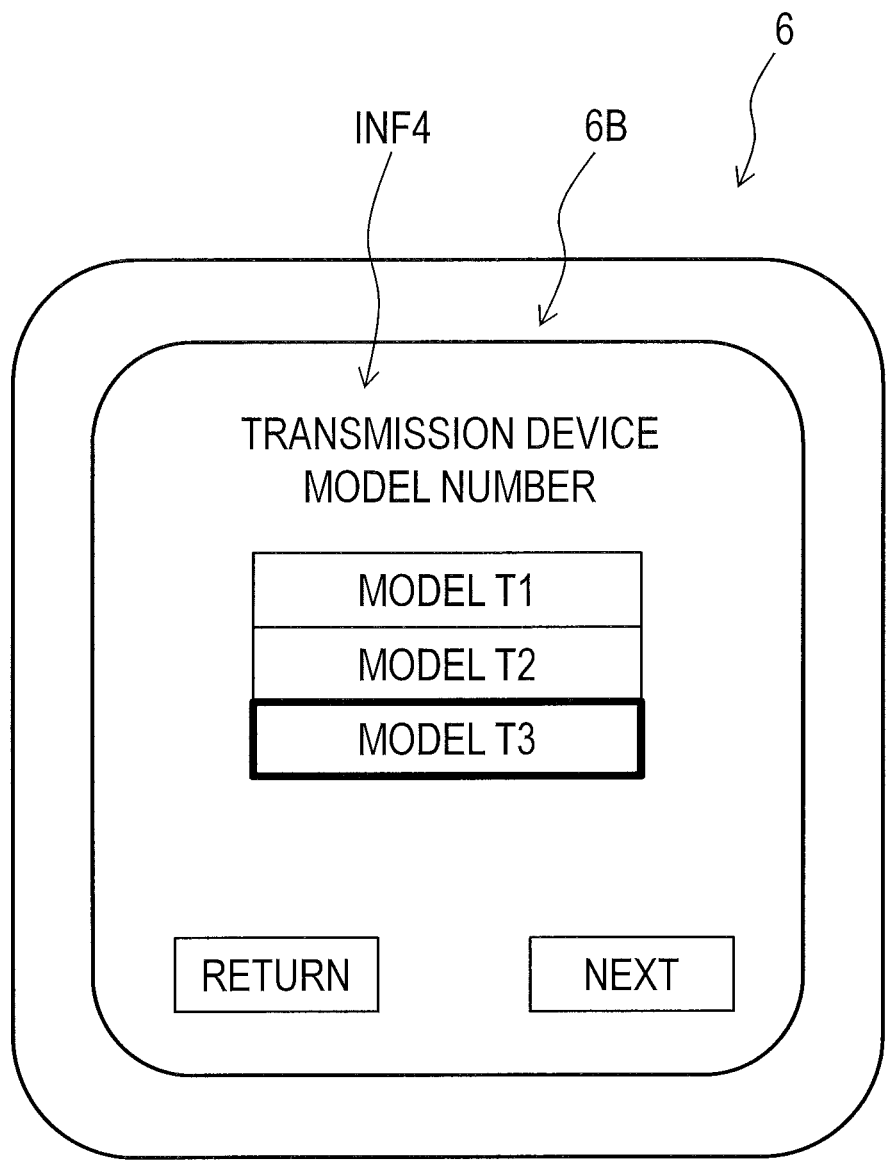
FIG. 13 is a plan view of the communication device of the human-powered vehicle illustrated in FIG. 1, with transmission device information displayed.

As seen in FIG. 13, the transmission model information INF4 includes at least one model number of at least one transmission device such as the electric devices RD and FD. The display 6B of the communication device 6 is configured to display at least one model number of at least one transmission device. The communication device 6 is configured to allow the user to select one of the at least one model number of at least one transmission device. The communication device 6 is configured to store selected one of the at least one model number of at least one transmission device.

Figure 14:
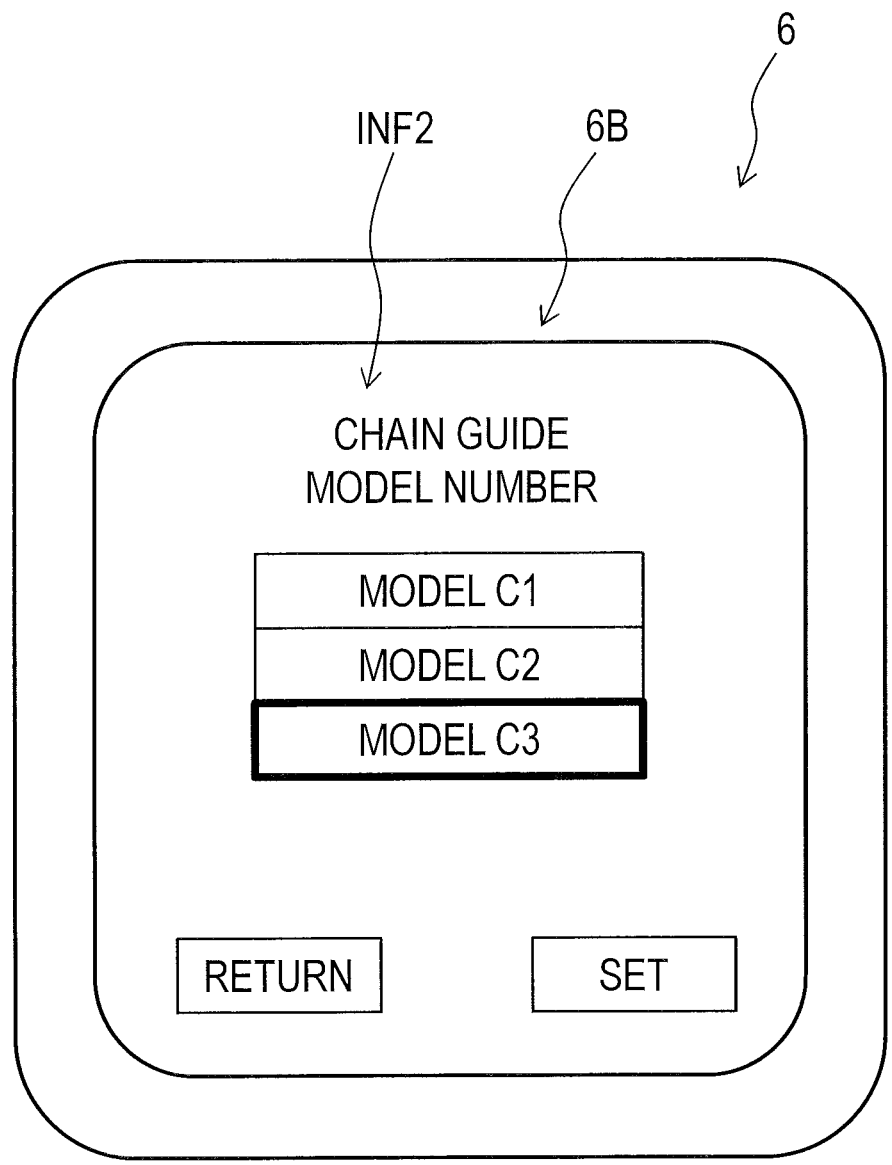
FIG. 14 is a plan view of the communication device of the human-powered vehicle illustrated in FIG. 1, with chain guide information displayed.

As seen in FIG. 14, the chain guide information INF2 includes chain-guide model information of each of at least two different chain guides such as the chain guides 14A, 14B, and 14C. The display 6B of the communication device 6 is configured to display at least one model number of at least one chain guide. The communication device 6 is configured to allow the user to select one of the at least one model number of the at least one chain guide. The communication device 6 is configured to store selected one of the at least one model number of the at least one chain guide.

As seen in FIG. 6, the electronic controller circuitry EC1 is configured to store the at least two pieces of the gear changing information INF5. The electronic controller circuitry EC1 is configured to store the first gear changing information INF501, the second gear changing information INF502, and the third gear changing information INF503 in the memory EC12. The electronic controller circuitry EC1 is configured to store the first to twenty-seventh gear changing information INF501 to INF527.

As seen in FIG. 10, the electronic controller circuitry EC1 is configured to store the first stop positions P101 to P110 of the chain guide 14 in the memory EC12. The electronic controller circuitry EC1 is configured to store the second stop positions P201 to P211 of the chain guide 14 in the memory EC12. The electronic controller circuitry EC1 is configured to store the third stop positions P301 to P312 of the chain guide 14 in the memory EC12. The electronic controller circuitry EC1 is configured to store stop positions defined for each of the first to twenty-seventh gear changing information INF501 to INF527.

The electronic controller circuitry EC1 is configured to set, as the setting information INF1, one of the at least two pieces of the gear changing information INF5 which corresponds to the sprocket assembly RS. For example, the electronic controller circuitry EC1 is configured to set, as the setting information INF1, the first gear changing information INF501 which corresponds to the sprocket assembly RS1 in a case where the sprocket information INF3 indicates the sprocket assembly RS1. The electronic controller circuitry EC1 is configured to set, as the setting information INF1, the second gear changing information INF502 which corresponds to the sprocket assembly RS2 in a case where the sprocket information INF3 indicates the sprocket assembly RS2. The electronic controller circuitry EC1 is configured to set, as the setting information INF1, the third gear changing information INF503 which corresponds to the sprocket assembly RS3 in a case where the sprocket information INF3 indicates the sprocket assembly RS3.

The at least two pieces of the gear changing information INF5 respectively correspond to at least two different chain guides. For example, the first gear changing information INF501, the second gear changing information INF502, and the third gear changing information INF503 respectively correspond to the different chain guides 14A, 14B, and 14C.

The electronic controller circuitry EC1 is configured to set, as the setting information INF1, one of the at least two pieces of the gear changing information INF5 which corresponds to the chain guide 14. For example, the electronic controller circuitry EC1 is configured to set, as the setting information INF1, the first gear changing information INF501 which corresponds to the chain guide 14A in a case where the chain guide information INF2 indicates the chain guide 14A. The electronic controller circuitry EC1 is configured to set, as the setting information INF1, the second gear changing information INF502 which corresponds to the chain guide 14B in a case where the chain guide information INF2 indicates the chain guide 14B. The electronic controller circuitry EC1 is configured to set, as the setting information INF1, the third gear changing information INF503 which corresponds to the chain guide 14C in a case where the chain guide information INF2 indicates the chain guide 14C.

The electronic controller circuitry EC1 is configured to set one of the at least two pieces of the gear changing information INF5 as the setting information INF1 based on the transmission model information INF4. The electronic controller circuitry EC1 is configured to set one of the at least two pieces of the gear changing information INF5 as the setting information INF1 based on the transmission model information INF4 and the at least one of the chain guide information INF2 and the sprocket information INF3.

The electronic controller circuitry EC1 is configured to execute a software update using the communicator circuitry WC1. The electronic controller circuitry EC1 is configured to update at least one program stored in the memory EC12 through the software update. The electronic controller circuitry EC1 is configured to update the at least two pieces of the gear changing information INF5 through the software update. The electronic controller circuitry EC1 is configured to update the at least two pieces of the gear changing information INF5 stored in the memory EC12 through the software update. The electronic controller circuitry EC1 is configured to obtain data including at least two pieces of the gear changing information INF5 from the communication device 6 or the internet network through the software update. The electronic controller circuitry EC1 is configured to overwrite the at least two pieces of the gear changing information INF5 at least partially using the at least one piece of the gear changing information INF5 transmitted from the communication device 6. The electronic controller circuitry EC1 can be configured to be free of updating the at least two pieces of the gear changing information INF5 stored in the memory EC12 if needed or desired. The electronic controller circuitry EC1 can be configured to be free of the software update if needed or desired.

After the software update, the electronic controller circuitry EC1 is configured to set one of the updated at least two pieces of the gear changing information INF5 as the setting information INF1 based on the at least one of the chain guide information INF2 and the sprocket information INF3. The electronic controller circuitry EC1 is configured to set one of the updated at least two pieces of the gear changing information INF5 as the setting information INF1 based on the transmission model information INF4 and the at least one of the chain guide information INF2 and the sprocket information INF3.

The electronic controller circuitry EC1 is configured to store the at least one of the chain guide information INF2 and the sprocket information INF3 in the memory EC12 in a case where the electronic controller circuitry EC1 receives the at least one of the chain guide information INF2 and the sprocket information INF3 from the communication device 6. The electronic controller circuitry EC1 is configured to store the transmission model information INF4 in the memory EC12 in a case where the electronic controller circuitry EC1 receives the transmission model information INF4 from the communication device 6.

As seen in FIG. 6, each of the at least two pieces of the gear changing information INF5 includes at least one of reference chain guide information INF6 and reference sprocket information INF7 which correspond to one of the at least two pieces of the gear changing information INF5. Each of the at least two pieces of the gear changing information INF5 includes reference transmission model information INF8 corresponding to one of the at least two pieces of the gear changing information INF5.

For example, the reference chain guide information INF6 includes first reference chain guide information INF61, second reference chain guide information INF62, and third reference chain guide information INF63. The first reference chain guide information INF61 is indicative of the chain guide 14A. The second reference chain guide information INF62 is indicative of the chain guide 14B. The third reference chain guide information INF63 is indicative of the chain guide 14C.

The reference sprocket information INF7 includes first reference sprocket information INF71, second reference sprocket information INF72, and third reference sprocket information INF73. The first reference sprocket information INF71 is indicative of the sprocket assembly RS1. The second reference sprocket information INF72 is indicative of the sprocket assembly RS2. The third reference sprocket information INF73 is indicative of the sprocket assembly RS3.

The reference transmission model information INF8 includes first reference transmission model information INF81, second reference transmission model information INF82, and third reference transmission model information INF83. The first reference transmission model information INF81 is indicative of the electric device RD1. The second reference transmission model information INF82 is indicative of the electric device RD2. The third reference transmission model information INF83 is indicative of the electric device RD3.

As seen in FIG. 6, the electronic controller circuitry EC1 is configured to compare the chain guide information INF2 with the reference chain guide information INF6 in a case where the electronic controller circuitry EC1 receives the chain guide information INF2 from the communication device 6. For example, the electronic controller circuitry EC1 is configured to compare the chain guide information INF2 with the first reference chain guide information INF61, the second reference chain guide information INF62, and the third reference chain guide information INF63 in a case where the electronic controller circuitry EC1 receives the chain guide information INF2 from the communication device 6.

The electronic controller circuitry EC1 is configured to compare the sprocket information INF3 with the reference sprocket information INF7 in a case where the electronic controller circuitry EC1 receives the sprocket information INF3 from the communication device 6. For example, the electronic controller circuitry EC1 is configured to compare the sprocket information INF3 with the first reference sprocket information INF71, the second reference sprocket information INF72, and the third reference sprocket information INF73 in a case where the electronic controller circuitry EC1 receives the sprocket information INF3 from the communication device 6.

The electronic controller circuitry EC1 is configured to compare the transmission model information INF4 with the reference transmission model information INF8 in a case where the electronic controller circuitry EC1 receives the transmission model information INF4 from the communication device 6. For example, the electronic controller circuitry EC1 is configured to compare the transmission model information INF4 with the first reference transmission model information INF81, the second reference transmission model information INF82, and the third reference transmission model information INF83 in a case where the electronic controller circuitry EC1 receives the transmission model information INF4 from the communication device 6.

The electronic controller circuitry EC1 is configured to select one of the at least two pieces of the gear changing information INF5 which corresponds to one of at least two pieces of the reference chain guide information INF6 in a case where the chain guide information INF2 indicates the one of at least two pieces of the reference chain guide information INF6. The electronic controller circuitry EC1 is configured to store, as the setting information INF1 in the memory EC12, selected one of the at least two pieces of the gear changing information INF5 which corresponds to the one of at least two pieces of the reference chain guide information INF6 indicated by the chain guide information INF2.

For example, the electronic controller circuitry EC1 is configured to select the gear changing information INF501, INF502, INF503, INF504, INF505, INF506, INF507, INF508, or INF509 which corresponds to the first reference chain guide information INF61 in a case where the chain guide information INF2 indicates the first reference chain guide information INF61. The electronic controller circuitry EC1 is configured to select the gear changing information INF510, INF511, INF512, INF513, INF514, INF515, INF516, INF517, or INF518 which corresponds to the second reference chain guide information INF62 in a case where the chain guide information INF2 indicates the second reference chain guide information INF62. The electronic controller circuitry EC1 is configured to select the gear changing information INF519, INF520, INF521, INF522, INF523, INF524, INF525, INF526, or INF527 which corresponds to the third reference chain guide information INF63 in a case where the chain guide information INF2 indicates the third reference chain guide information INF63.

The electronic controller circuitry EC1 is configured to select one of the at least two pieces of the gear changing information INF5 which corresponds to one of at least two pieces of the reference sprocket information INF7 in a case where the sprocket information INF3 indicates the one of at least two pieces of the reference sprocket information INF7. The electronic controller circuitry EC1 is configured to store, as the setting information INF1 in the memory EC12, selected one of the at least two pieces of the gear changing information INF5 which corresponds to the one of at least two pieces of the reference sprocket information INF7 indicated by the sprocket information INF3.

For example, the electronic controller circuitry EC1 is configured to select the first gear changing information INF501, INF504, INF507, INF510, INF513, INF516, INF519, INF522, or INF525 which corresponds to the first reference sprocket information INF71 in a case where the sprocket information INF3 indicates the first reference sprocket information INF71. The electronic controller circuitry EC1 is configured to select the second gear changing information INF502, INF505, INF508, INF511, INF514, INF517, INF520, INF523, or INF526 which corresponds to the second reference sprocket information INF72 in a case where the sprocket information INF3 indicates the second reference sprocket information INF72. The electronic controller circuitry EC1 is configured to select the third gear changing information INF503, INF506, INF509, INF512, INF515, INF518, INF521, INF524, or INF527 which corresponds to the third reference sprocket information INF73 in a case where the sprocket information INF3 indicates the third reference sprocket information INF73.

The electronic controller circuitry EC1 is configured to select one of the at least two pieces of the gear changing information INF5 which corresponds to one of at least two pieces of the reference transmission model information INF8 in a case where the transmission model information INF4 indicates the one of at least two pieces of the reference transmission model information INF8. The electronic controller circuitry EC1 is configured to store, as the setting information INF1 in the memory EC12, selected one of the at least two pieces of the gear changing information INF5 which corresponds to the one of at least two pieces of the reference transmission model information INF8 indicated by the transmission model information INF4.

For example, the electronic controller circuitry EC1 is configured to select the first gear changing information INF501, INF502, INF503, INF510, INF511, INF512, INF519, INF520, or INF521 which corresponds to the first reference transmission model information INF81 in a case where the transmission model information INF4 indicates the first reference transmission model information INF81. The electronic controller circuitry EC1 is configured to select the second gear changing information INF504, INF505, INF506, INF513, INF514, INF515, INF522, INF523, or INF524 which corresponds to the second reference transmission model information INF82 in a case where the transmission model information INF4 indicates the second reference transmission model information INF82. The electronic controller circuitry EC1 is configured to select the third gear changing information INF507, INF508, INF509, INF516, INF517, INF518, INF525, INF526, or INF527 which corresponds to the third reference transmission model information INF83 in a case where the transmission model information INF4 indicates the third reference transmission model information INF83.

The electronic controller circuitry EC1 is configured to select one of the at least two pieces of the gear changing information INF5 which corresponds to one of at least two pieces of the reference chain guide information INF6, which corresponds one of at least two pieces of the reference sprocket information INF7, and which corresponds one of at least two pieces of the reference transmission model information INF8 in a case where the chain guide information INF2 indicates the one of at least two pieces of the reference chain guide information INF6, where the sprocket information INF3 indicates the one of at least two pieces of the reference sprocket information INF7, and where the transmission model information INF4 indicates the one of at least two pieces of the reference transmission model information INF8. The electronic controller circuitry EC1 is configured to store, as the setting information INF1 in the memory EC12, selected one of the at least two pieces of the gear changing information INF5 which corresponds to the one of at least two pieces of the reference chain guide information INF6 indicated by the chain guide information INF2, which corresponds one of at least two pieces of the reference sprocket information INF7 indicated by the sprocket information INF3, and which corresponds one of at least two pieces of the reference transmission model information INF8 indicated by the transmission model information INF4.

For example, the electronic controller circuitry EC1 is configured to select the gear changing information INF501 which corresponds to the first reference chain guide information INF61, the first reference sprocket information INF71, and the first reference transmission model information INF81 in a case where the chain guide information INF2 indicates the first reference chain guide information INF61, where the sprocket information INF3 indicates the first reference sprocket information INF71, and where the transmission model information INF4 indicates the first reference transmission model information INF81. The electronic controller circuitry EC1 is configured to select the gear changing information INF502 which corresponds to the first reference chain guide information INF61, the second reference sprocket information INF72, and the first reference transmission model information INF81 in a case where the chain guide information INF2 indicates the first reference chain guide information INF61, where the sprocket information INF3 indicates the second reference sprocket information INF72, and where the transmission model information INF4 indicates the first reference transmission model information INF81. The electronic controller circuitry EC1 is configured to select the gear changing information INF502 which corresponds to the first reference chain guide information INF61, the third reference sprocket information INF73, and the first reference transmission model information INF81 in a case where the chain guide information INF2 indicates the first reference chain guide information INF61, where the sprocket information INF3 indicates the third reference sprocket information INF73, and where the transmission model information INF4 indicates the first reference transmission model information INF81.

The control executed by the control system 10 will be described in detail below referring to FIG. 15.

Figure 15:
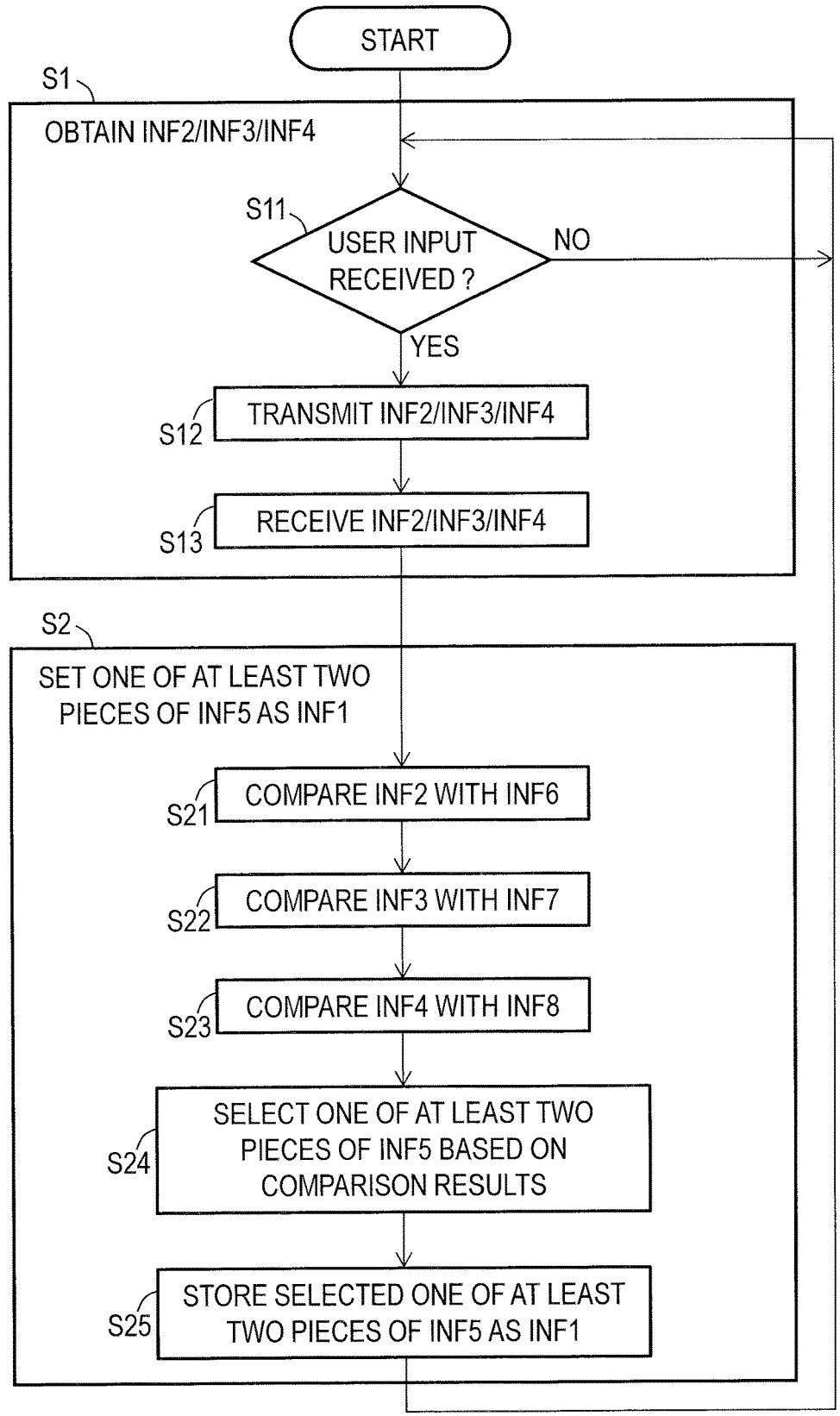
FIG. 15 is a flowchart showing control of the electric device.

As seen in FIG. 15, the non-transitory computer-readable storage medium EC42 stores at least one program for causing the at least one computer 6 to execute at least one process. The at least one process comprises obtaining at least one of the chain guide information INF2 and the sprocket information INF3 via the user interface 6A (e.g., step S11); obtaining the transmission model information INF4 of each of at least two different electric devices via the user interface 6A (e.g., step S11); and transmitting via the communicator circuitry WC4 to the electric device RD, based on the transmission model information INF4 and the at least one of the chain guide information INF2 and the sprocket information INF3, information necessary to set one of at least two pieces of the gear changing information INF5 as the setting information INF1 (e.g., step S12).

As seen in FIG. 15, the electronic controller circuitry EC1 obtains at least one of the chain guide information INF2 and the sprocket information INF3 (step S1). The electronic controller circuitry EC1 obtains the transmission model information INF4 (step S1).

For example, in a case where the communication device 6 receives the user input U6 indicating the chain guide information INF2 via the user interface 6A, the communication device 6 wirelessly transmits the chain guide information INF2 to the electric device RD via the communicator circuitry WC4 (steps S11 and S12). In a case where the communication device 6 receives the user input U6 indicating the sprocket information INF3 via the user interface 6A, the communication device 6 wirelessly transmits the sprocket information INF3 to the electric device RD via the communicator circuitry WC4 (steps S11 and S12). In a case where the communication device 6 receives the user input U6 indicating the transmission model information INF4 via the user interface 6A, the communication device 6 wirelessly transmits the transmission model information INF4 to the electric device RD via the communicator circuitry WC4 (steps S11 and S12).

The electronic controller circuitry EC1 wirelessly receives the chain guide information INF2 from the communication device 6 in a case where the communication device 6 wirelessly transmits the chain guide information INF2 (step S13). The electronic controller circuitry EC1 wirelessly receives the sprocket information INF3 from the communication device 6 in a case where the communication device 6 wirelessly transmits the sprocket information INF3 (step S13). The electronic controller circuitry EC1 wirelessly receives the transmission model information INF4 from the communication device 6 in a case where the communication device 6 wirelessly transmits the transmission model information INF4 (step S13).

The electronic controller circuitry EC1 sets one of the at least two pieces of the gear changing information INF5 as the setting information INF1 (step S2).

For example, the electronic controller circuitry EC1 compares the chain guide information INF2 with the reference chain guide information INF6 in a case where the electronic controller circuitry EC1 obtains the chain guide information INF2 (step S21). The electronic controller circuitry EC1 compares the sprocket information INF3 with the reference sprocket information INF7 in a case where the electronic controller circuitry EC1 obtains the sprocket information INF3 (step S22). The electronic controller circuitry EC1 compares the transmission model information INF4 with the reference transmission model information INF8 in a case where the electronic controller circuitry EC1 obtains the transmission model information INF4 (step S23). The order of the steps S21 to S23 is not limited to the illustrated embodiment. The steps S21 to S23 can be executed in an arbitrary order.

The electronic controller circuitry EC1 selects one of the at least two pieces of the gear changing information INF5 based on the comparison results of the step S21 to S23 (step S24). The electronic controller circuitry EC1 stores selected one of the at least two pieces of the gear changing information INF5 as the setting information INF1 in the memory EC12 (step S25).

Thus, the setting information INF1 enables the electric device RD to stop the chain guide 14 in a preferable stop position relative to the sprocket assembly RS during the gear shift control. This can smoothen the gear change of the electric device RD.

In the above-mentioned embodiment and the modifications thereof, the electronic controller circuitry EC1 is configured to set one of the at least two pieces of the gear changing information INF5 as the setting information INF1 based on the transmission model information INF4 in addition to the at least one of the chain guide information INF2 and the sprocket information INF3. However, the electronic controller circuitry EC1 can be configured to set one of the at least two pieces of the gear changing information INF5 as the setting information INF1 based on the at least one of the chain guide information INF2 and the sprocket information INF3 without using the transmission model information INF4 if needed or desired. In such modifications, the selection screen depicted in FIG. 13 can be omitted.

Figure 16:
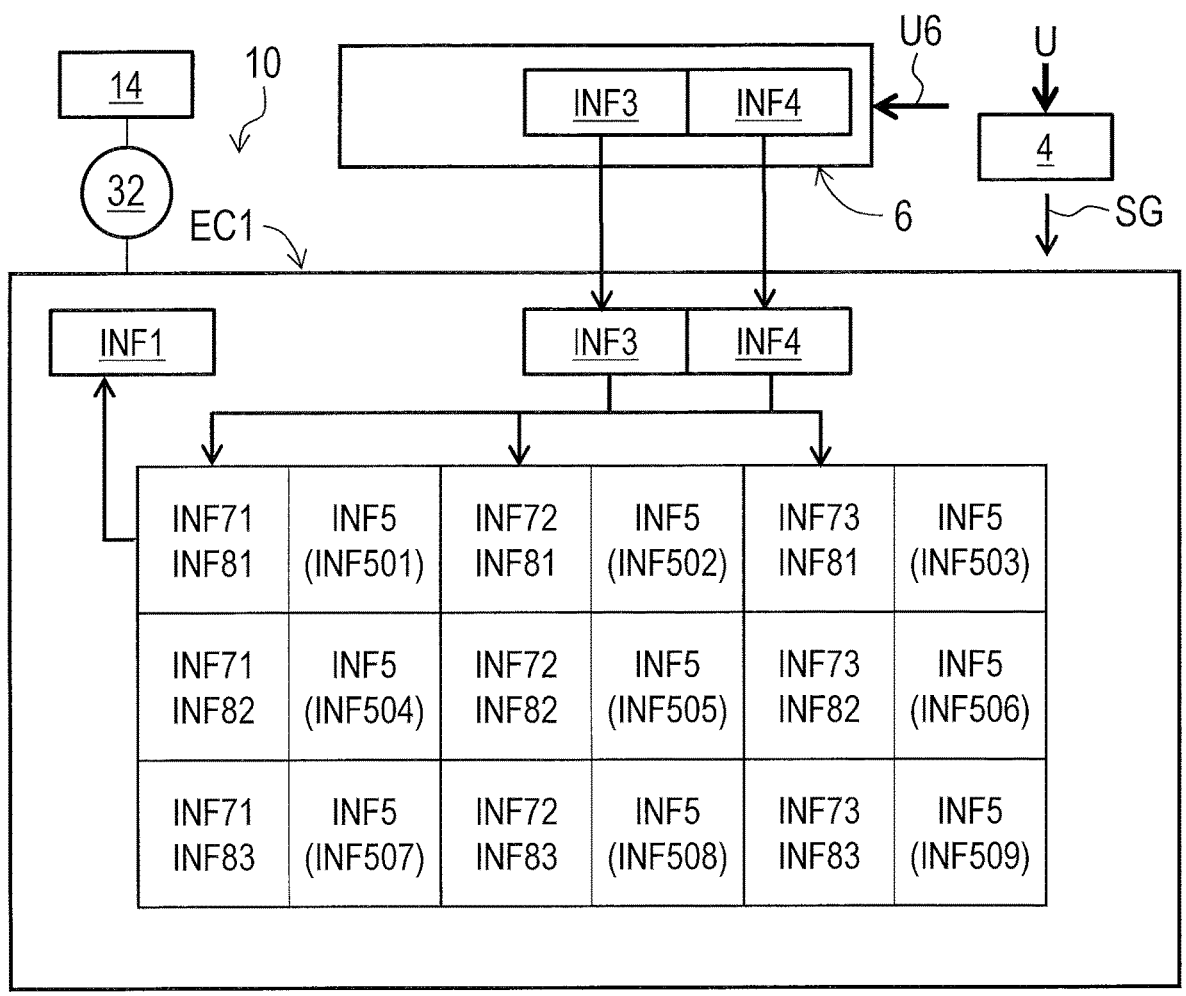
FIG. 16 is a schematic block diagram of an electric device in accordance with a first modification, with gear changing information.
Figure 17:
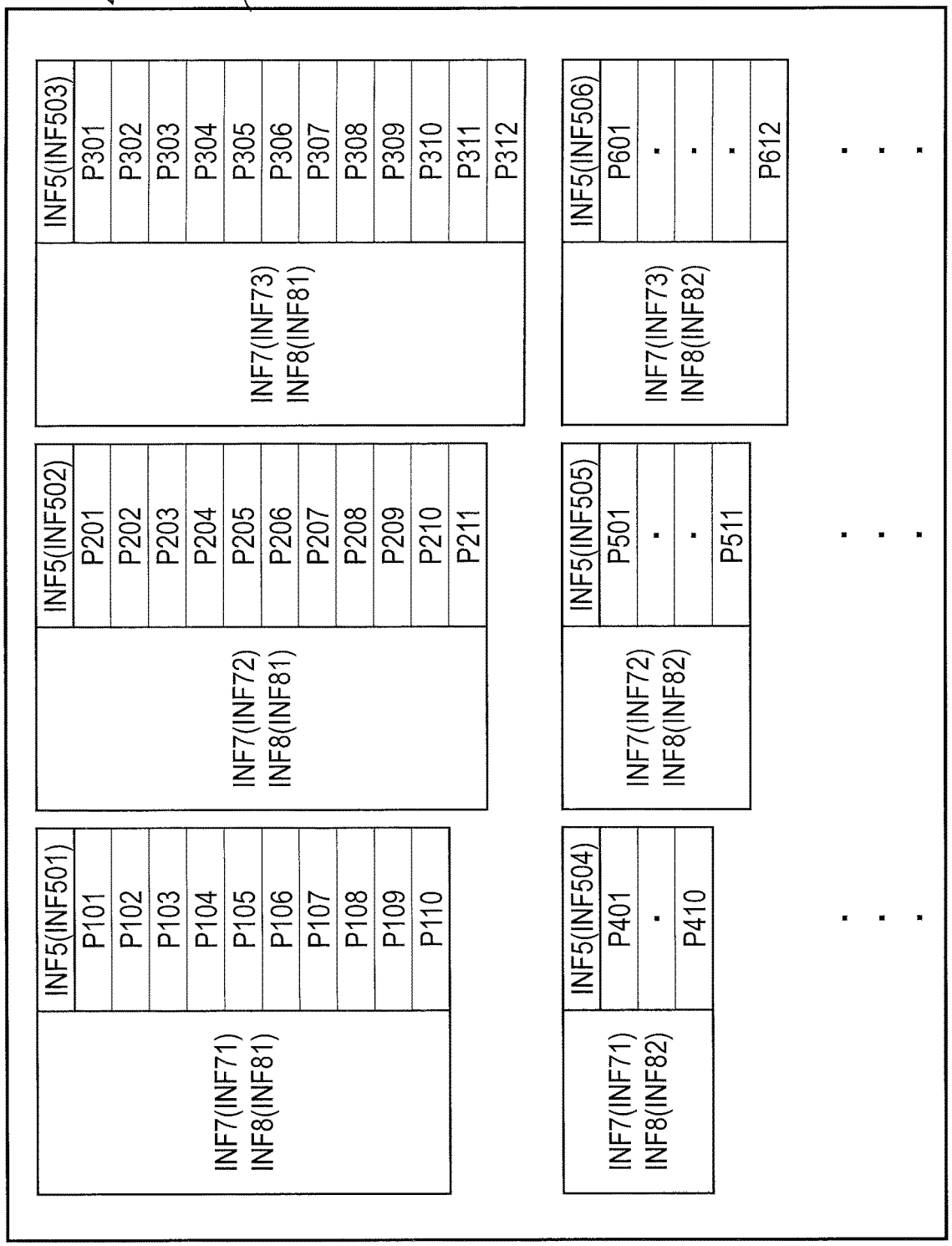
FIG. 17 is a schematic view showing the gear changing information illustrated in FIG. 16.
Figure 18:
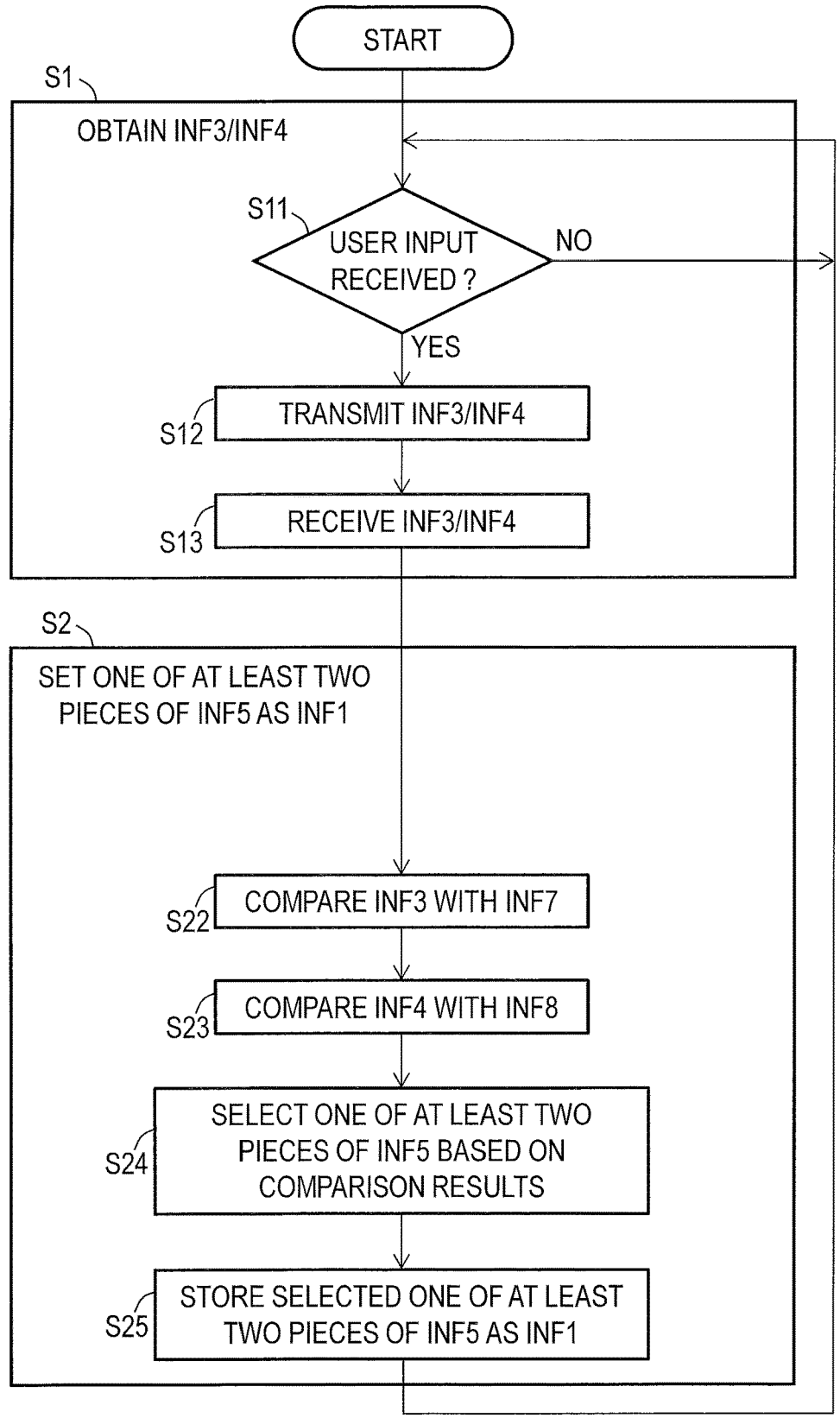
FIG. 18 is a flowchart showing control of the electric device illustrated in FIG. 16.

In the above-mentioned embodiment and the modifications thereof, the electronic controller circuitry EC1 is configured to set one of the at least two pieces of the gear changing information INF5 as the setting information INF1 based on both the chain guide information INF2 and the sprocket information INF3. However, the electronic controller circuitry EC1 can be configured to set one of the at least two pieces of the gear changing information INF5 as the setting information INF1 based on only one of the chain guide information INF2 and the sprocket information INF3 if needed or desired. As seen in FIGS. 16 to 18, for example, the electronic controller circuitry EC1 can be configured to set one of the at least two pieces of the gear changing information INF5 as the setting information INF1 based on the sprocket information INF3 without using the chain guide information INF2 if needed or desired. In the modification depicted in FIGS. 16 and 17, the reference chain guide information INF6 is omitted from the information stored in the electronic controller circuitry EC1. As seen in FIG. 16, at least two pieces of the gear changing information INF510 to INF527 are omitted from the information stored in the electronic controller circuitry EC1. In the flowchart illustrated in FIG. 18, the chain guide information INF2 and the step S21 are omitted. In such a modification, the selection screen depicted in FIG. 14 can be omitted. Furthermore, the transmission model information INF4 can be omitted from the modification depicted in FIGS. 16 to 18 if needed or desired.

Figure 19:
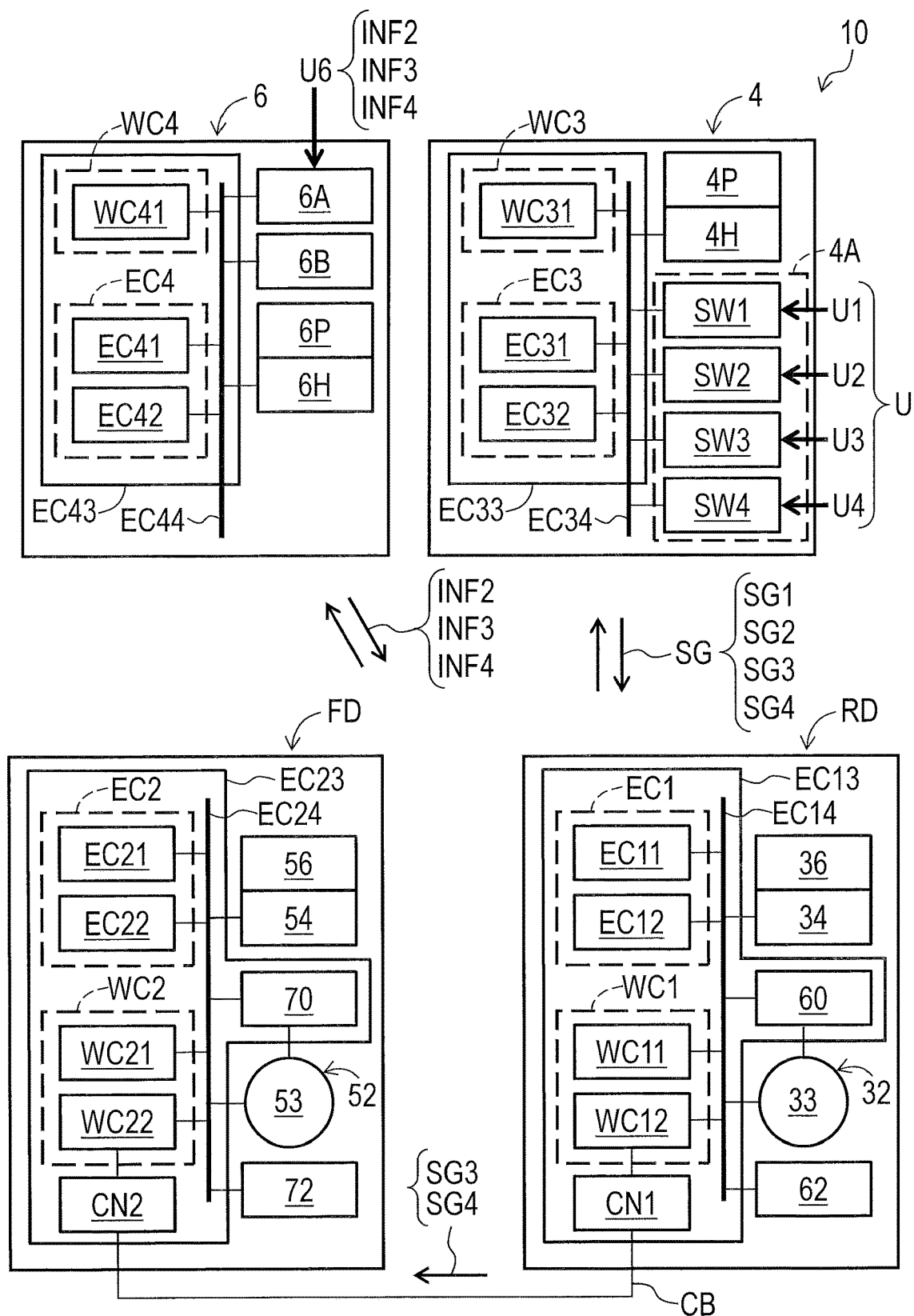
FIG. 19 is a schematic block diagram of an electric device in accordance with a second modification.

In the above-mentioned embodiment and the modifications thereof, the operating device 4, the communication device 6, the electric device RD, and the electric device FD are configured to wirelessly communicate. However, at least two of the operating device 4, the communication device 6, the electric device RD, and the electric device FD can be configured to communicate via an electric cable if needed or desired. As seen in FIG. 19, for example, the electric device RD can be configured to communicate with the electric device FD via an electric cable CB. The wired communicator circuitry WC12 of the electric device RD can be configured to communicate with the wired communicator circuitry WC22 of the electric device FD via the electric cable CB. In the modification illustrated in FIG. 19, the electric device RD transmits the control signal SG3 or SG4 to the electric device FD via the wired communicator circuitry WC12, the electric cable CB, and the wired communicator circuitry WC22. Furthermore, at least one of the operating device 4 and the communication device 6 can be configured to communicate with at least one of the electric devices RD and FD via an electric cable if needed or desired. In such modifications, the at least one of the operating device 4 and the communication device 6 can include wired communicator circuitry configured to be electrically connected to the at least one of the electric devices RD and FD via the electric cable. The operating device 4 transmits the control signal SG1, SG2, SG3, or SG4 to at least one of the electric devices RD and FD via the electric cable.

In the modification illustrated in FIG. 19, the electric devices RD and FD can be configured to share an electric power source provided in one of the electric devices RD and FD or an electric power source which is provided outside the electric devices RD and FD and which is electrically connected to the electric cable CB.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electric device of a human-powered vehicle, the electric device comprising:
    electronic controller circuitry configured to obtain at least one of chain guide information and sprocket information, the chain guide information being indicative of at least one chain guide, the sprocket information being indicative of at least one sprocket assembly;
    the electronic controller circuitry being configured to set one of at least two pieces of gear changing information as setting information based on the at least one of the chain guide information and the sprocket information;
    the electronic controller circuitry being configured to perform a gear shift control based on the setting information; and
    each of the at least two pieces of the gear changing information including at least two stop positions of a chain guide respectively corresponding to at least two sprockets of a sprocket assembly.

2. The electric device according to claim 1, wherein the sprocket information includes at least one of:
    sprocket model information of each of at least two different sprocket assemblies;
    a total number of at least two sprockets included in each of at least two different sprocket assemblies; and
    a combination of at least two total tooth numbers of at least two sprockets included in each of at least two different sprocket assemblies.

3. The electric device according to claim 1, wherein the chain guide information includes at least one of:
    chain-guide model information of each of at least two different chain guides; and
    a reference distance of each of at least two different chain guides.

4. The electric device according to claim 3, wherein the reference distance includes a distance defined between a pivot axis of one of the at least two different chain guides and a rotational axis of a pulley of the one of the at least two different chain guides.

5. The electric device according to claim 3, wherein the reference distance includes a distance defined between a first rotational axis of a first pulley of one of the at least two different chain guides and a second rotational axis of a second pulley of the one of the at least two different chain guides.

6. The electric device according to claim 1, wherein the electronic controller circuitry is configured to store the at least two pieces of the gear changing information.

7. The electric device according to claim 1, wherein the at least two pieces of the gear changing information includes first gear changing information and second gear changing information,
the first gear changing information includes at least two first stop positions of the chain guide,
the second gear changing information includes at least two second stop positions of the chain guide, and
a total number of the at least two first stop positions is different from a total number of the at least two second stop positions.

8. The electric device according to claim 1, wherein the at least two pieces of the gear changing information respectively correspond to at least two different sprocket assemblies, and
the electronic controller circuitry is configured to set, as the setting information, one of the at least two pieces of the gear changing information which corresponds to the sprocket assembly.

9. The electric device according to claim 1, wherein the at least two pieces of the gear changing information respectively correspond to at least two different chain guides, and
the electronic controller circuitry is configured to set, as the setting information, one of the at least two pieces of the gear changing information which corresponds to the chain guide.

10. The electric device according to claim 1, wherein the electronic controller circuitry is configured to obtain transmission model information of each of at least two different electric devices, and the electronic controller circuitry is configured to set one of the at least two pieces of the gear changing information as the setting information based on the transmission model information.

11. The electric device according to claim 1, further comprising
communicator circuitry configured to receive the at least one of the chain guide information and the sprocket information from a communication device, the communication device being configured to output the at least one of chain guide information and sprocket information.

12. The electric device according to claim 11, wherein
the communicator circuitry is configured to wirelessly receive the at least one of the chain guide information and the sprocket information from the communication device.

13. The electric device according to claim 11, wherein
the electronic controller circuitry is configured to obtain, via the communicator circuitry, a user input received by the communication device.

14. The electric device according to claim 11, wherein
the communication device is configured to obtain the at least two pieces of the gear changing information through an internet network.

15. The electric device according to claim 11, wherein
the electronic controller circuitry is configured to execute a software update using the communicator circuitry, and
the electronic controller circuitry is configured to update the at least two pieces of the gear changing information through the software update.

16. A control system of a human-powered vehicle, the control system comprising:
the electric device according to claim 1; and
a communication device configured to output the at least one of chain guide information and sprocket information.

17. A non-transitory computer-readable storage medium storing at least one program for causing at least one computer to execute at least one process comprising:
obtaining at least one of chain guide information and sprocket information via a user interface, the chain guide information being indicative of at least one chain guide, the sprocket information being indicative of at least one sprocket assembly;
obtaining transmission model information of each of at least two different electric devices via the user interface; and
transmitting via communicator circuitry to an electric device, based on the transmission model information and the at least one of the chain guide information and the sprocket information, information necessary to set one of at least two pieces of gear changing information as setting information.

18. The non-transitory computer-readable storage medium according to claim 17, wherein
the sprocket information includes at least one of:
sprocket model information of each of at least two different sprocket assemblies;
a total number of at least two sprockets included in each of at least two different sprocket assemblies; and
a combination of at least two total tooth numbers of at least two sprockets included in each of at least two different sprocket assemblies.

19. The non-transitory computer-readable storage medium according to claim 17, wherein
the chain guide information includes at least one of:
chain-guide model information of each of at least two different chain guides; and
a reference distance of each of at least two different chain guides.

* * * * *